(12) United States Patent
Katakura

(10) Patent No.: US 7,746,562 B2
(45) Date of Patent: Jun. 29, 2010

(54) ZOOM LENS AND IMAGE PICKUP APPARATUS USING THE SAME

(75) Inventor: Masahiro Katakura, Chohu (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 12/378,778

(22) Filed: Feb. 18, 2009

(65) Prior Publication Data

US 2009/0207499 A1   Aug. 20, 2009

(30) Foreign Application Priority Data

Feb. 20, 2008  (JP) ............................. 2008-039164

(51) Int. Cl.
*G02B 15/14* (2006.01)
(52) U.S. Cl. .................... 359/678; 359/686; 359/695
(58) Field of Classification Search ................ 359/686, 359/676, 678, 682, 684, 695, 764, 753, 763
See application file for complete search history.

(56) References Cited

U.S. PATENT DOCUMENTS 5,583,701 A * 12/1996 Yamanashi .................. 359/695
5,973,854 A * 10/1999 Shimo ........................ 359/676
7,312,931 B2 * 12/2007 Sano et al. .................. 359/683

* cited by examiner

*Primary Examiner*—Alicia M Harrington
(74) *Attorney, Agent, or Firm*—Kenyon & Kenyon LLP

(57) ABSTRACT

A zoom lens, which changes a magnification by properly changing distances between a plurality of lens components, has, in order from the object side, a first lens component with positive power, a second lens component with negative power, a third lens component with positive power, a fourth lens component with positive power, and a fifth lens component with positive power, and the first lens component has a reflecting member changing an optical path. The zoom lens satisfies the following conditions:

$$1.6 < \beta_2(t)/\beta_2(w) < 10.0$$

$$3.3 < \beta_4(t)/\beta_4(w) < 10.0$$

where $\beta_2(t)$ is a lateral magnification of the second lens component in a telephoto position in infinite focusing, $\beta_2(w)$ is a lateral magnification of the second lens component in a wide-angle position in infinite focusing, $\beta_4(t)$ is a lateral magnification of the fourth lens component in the telephoto position in infinite focusing, and $\beta_4(w)$ is a lateral magnification of the fourth lens component in the wide-angle position in infinite focusing.

8 Claims, 14 Drawing Sheets

EMBODIMENT 1

EMBODIMENT 1

EMBODIMENT 1
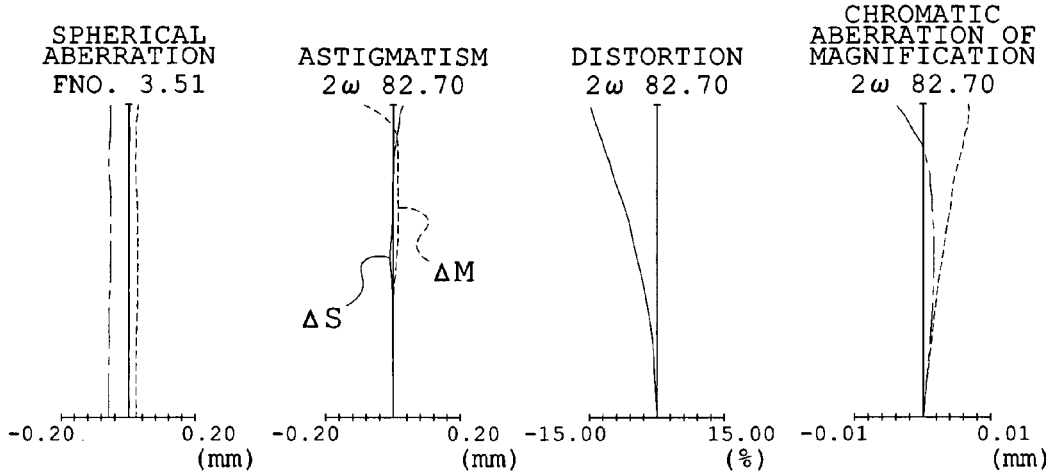
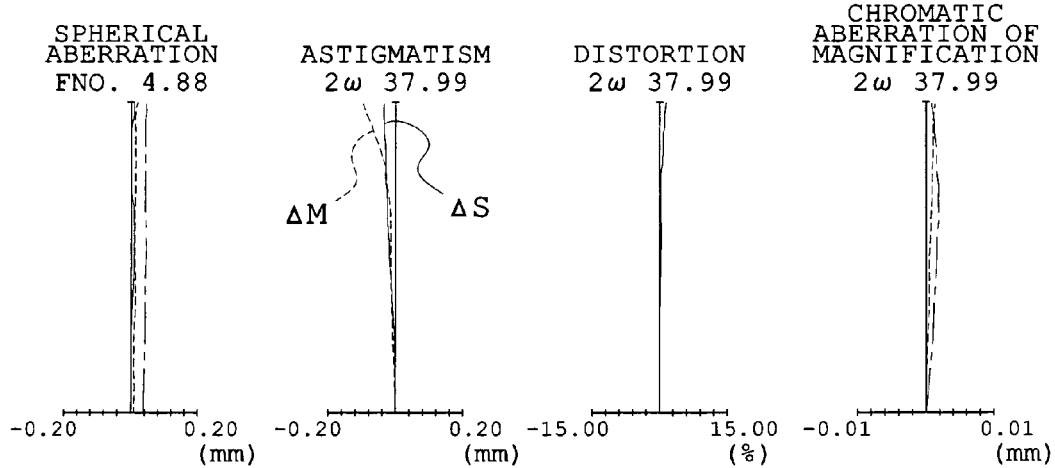
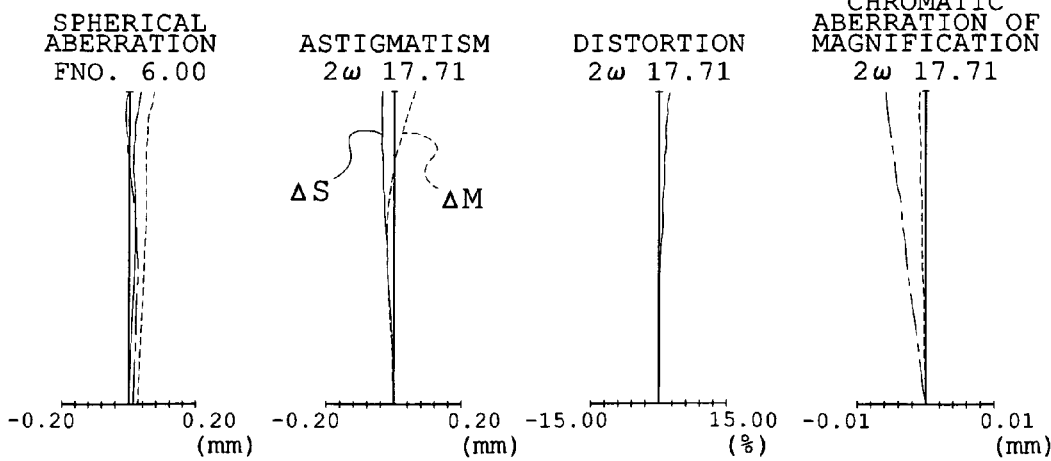

EMBODIMENT 2

EMBODIMENT 2
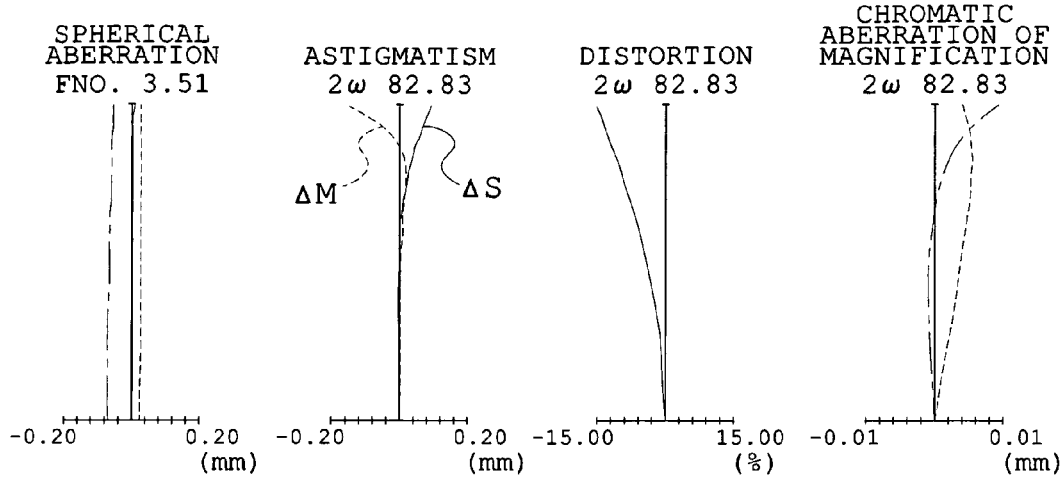
FIG.4A SPHERICAL ABERRATION FNO. 3.51
FIG.4B ASTIGMATISM 2ω 82.83
FIG.4C DISTORTION 2ω 82.83
FIG.4D CHROMATIC ABERRATION OF MAGNIFICATION 2ω 82.83
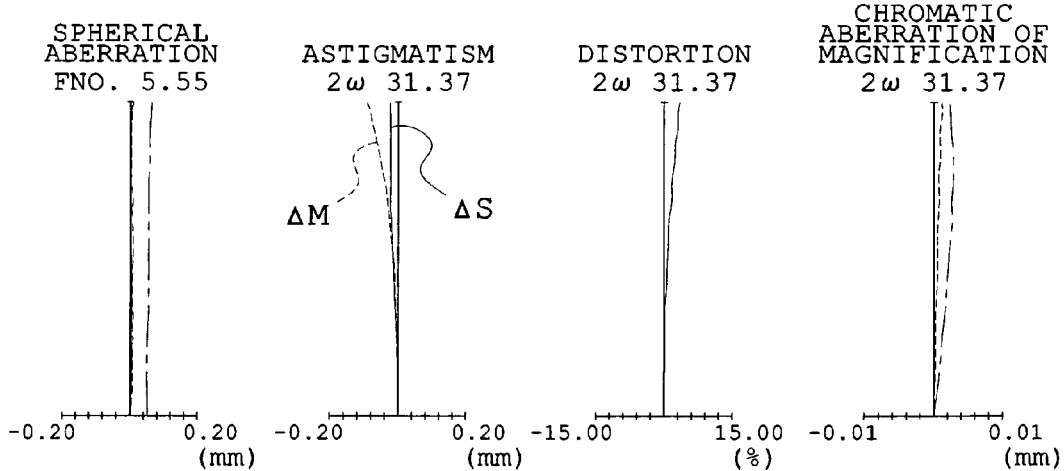
FIG.4E SPHERICAL ABERRATION FNO. 5.55
FIG.4F ASTIGMATISM 2ω 31.37
FIG.4G DISTORTION 2ω 31.37
FIG.4H CHROMATIC ABERRATION OF MAGNIFICATION 2ω 31.37
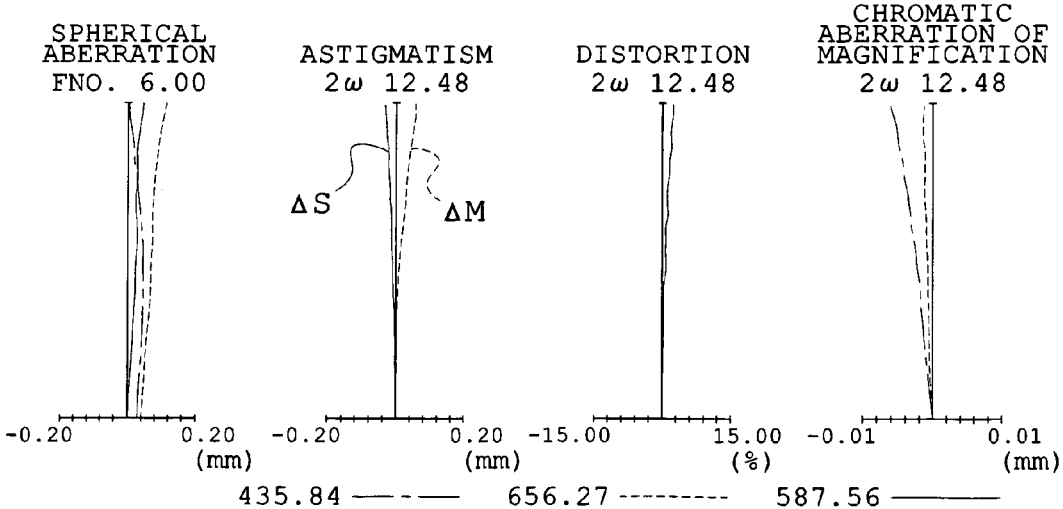
FIG.4I SPHERICAL ABERRATION FNO. 6.00
FIG.4J ASTIGMATISM 2ω 12.48
FIG.4K DISTORTION 2ω 12.48
FIG.4L CHROMATIC ABERRATION OF MAGNIFICATION 2ω 12.48
435.84 —·—   656.27 ---------   587.56 ———

EMBODIMENT 3

EMBODIMENT 3
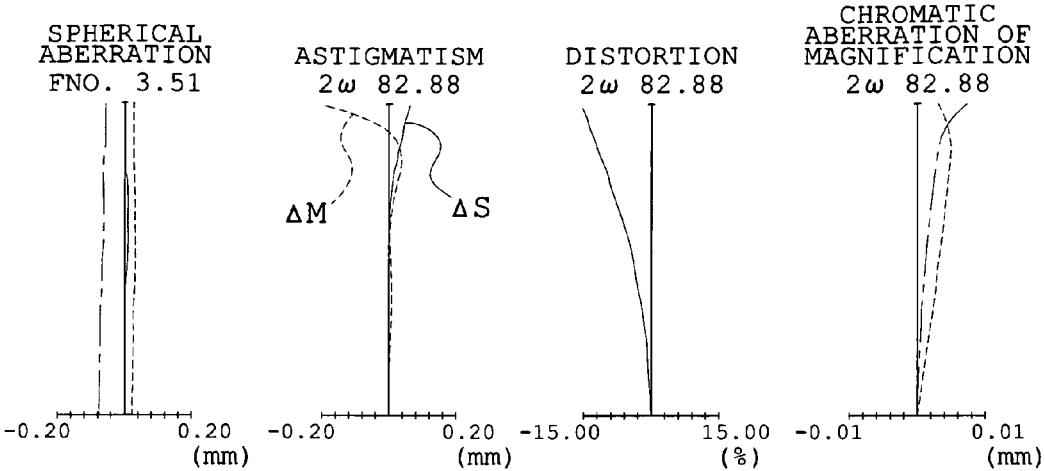
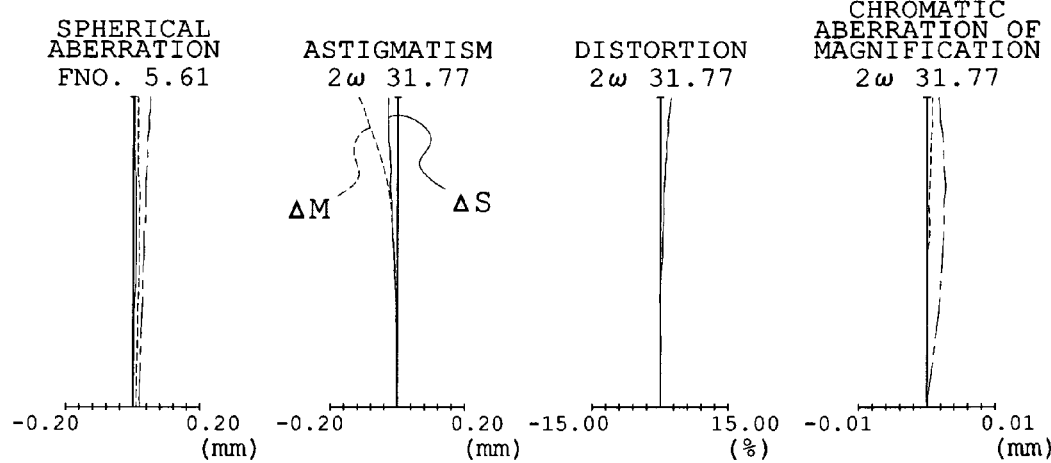
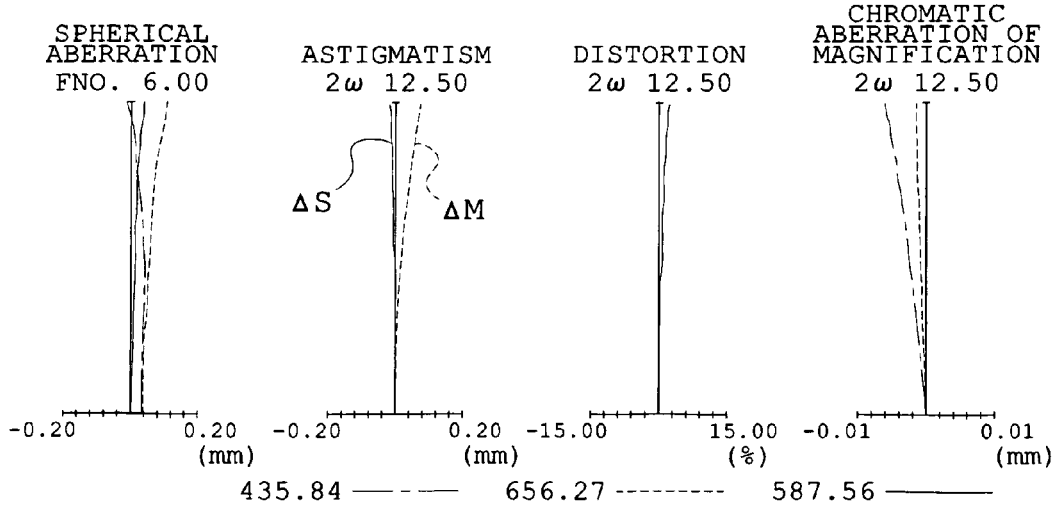

EMBODIMENT 4

EMBODIMENT 4
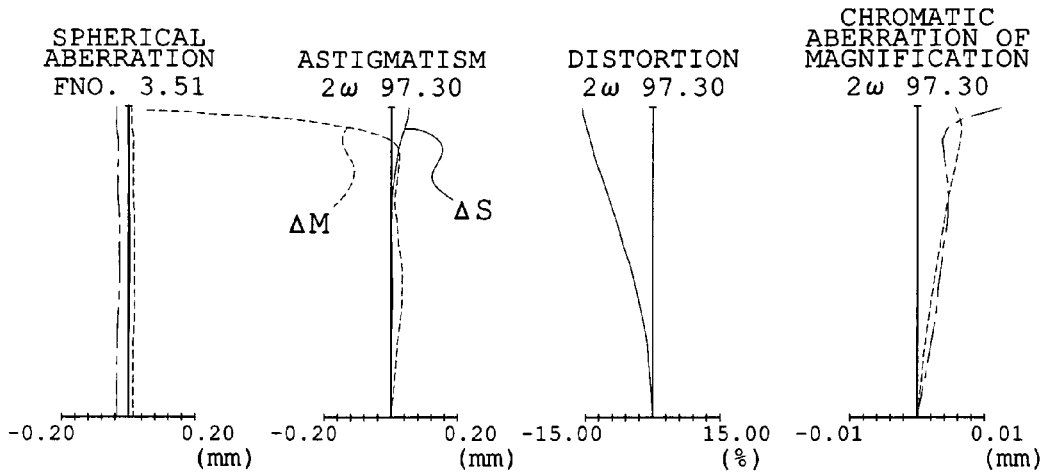
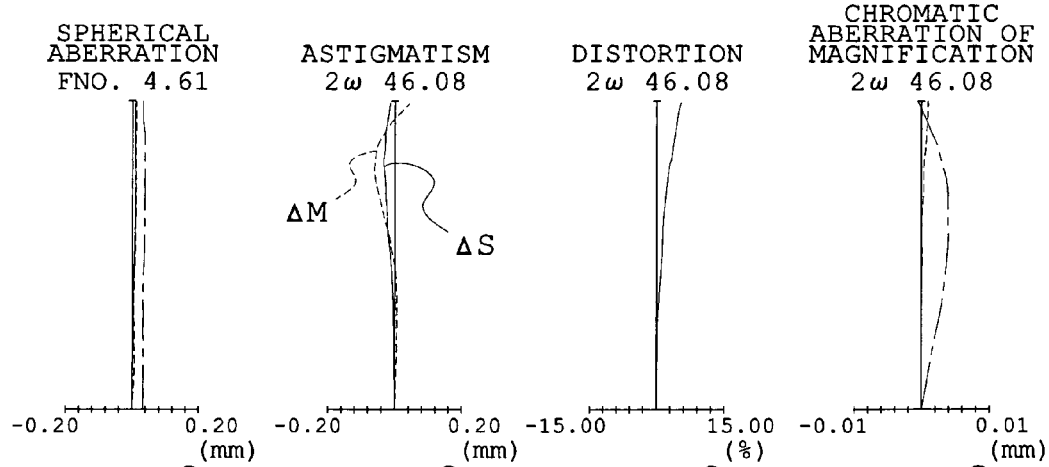
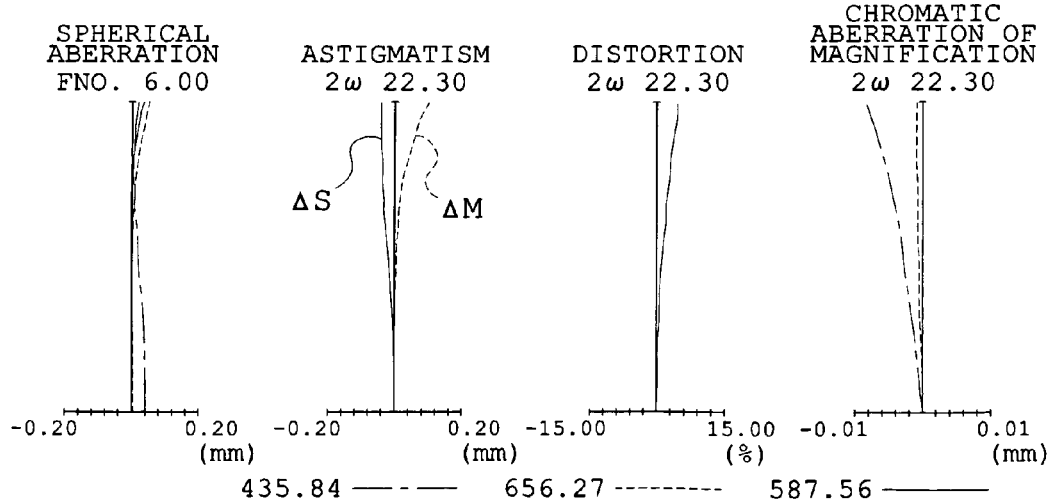

FIG.16A
FIG.16B
FIG.16C
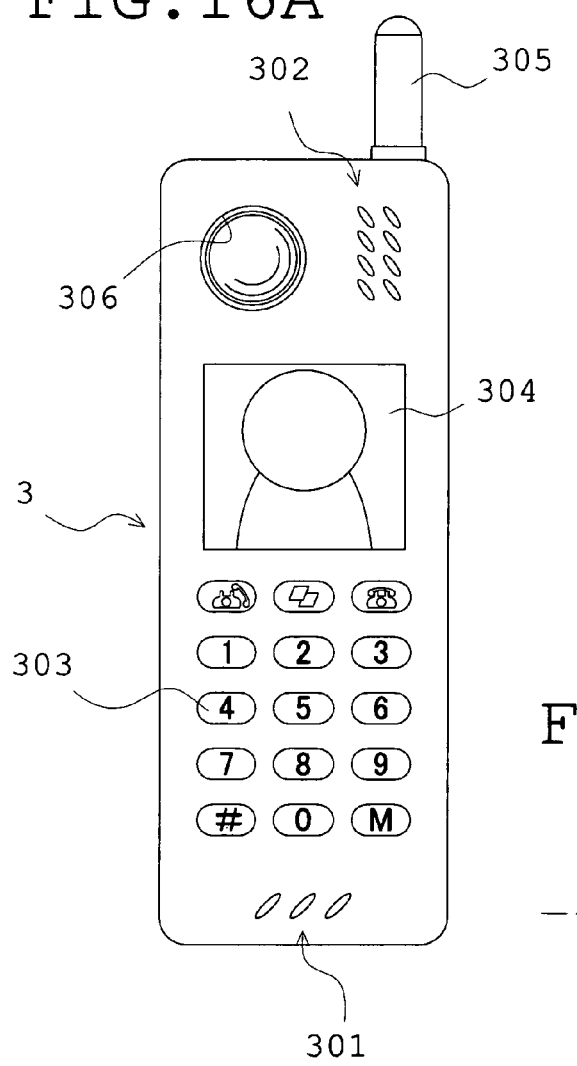
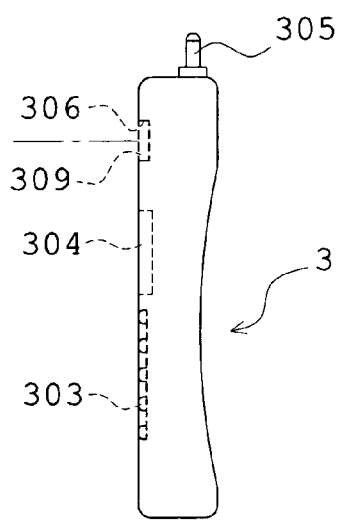
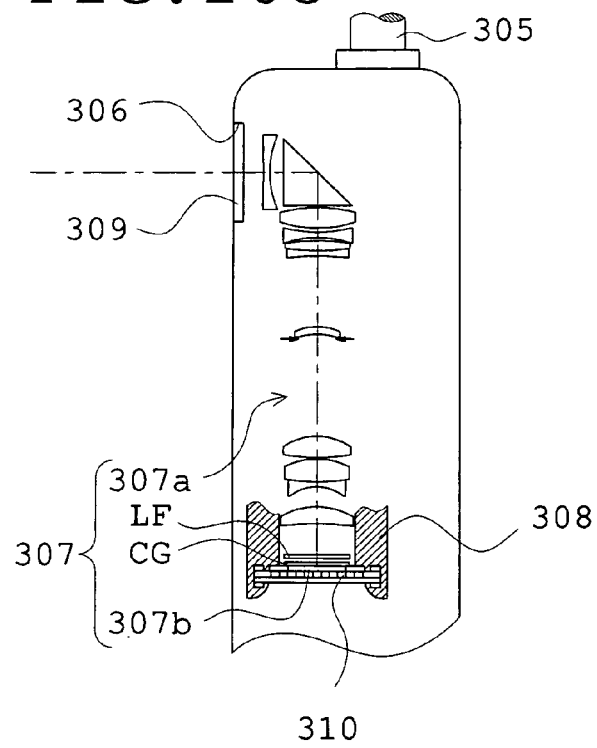

ZOOM LENS AND IMAGE PICKUP
APPARATUS USING THE SAME

This application claims benefits of Japanese Patent Application No. 2008-039164 filed in Japan on Feb. 20, 2008, the contents of which are hereby incorporated by reference.

BACKGROUND OF THE INVENTION

1. Field of the Invention

This invention relates to a zoom lens suitable for compact digital still cameras or digital video cameras (which are hereinafter generically called digital cameras) and an image pick up apparatus provided with this zoom lens and an image sensor.

2. Description of the Related Art

It has been required that the zoom lens adopted to the digital camera is wide in angle of view, high in magnification, and compact in design. As a zoom lens satisfying such requirements, a zoom lens which includes, in order from the object side, a first lens component with positive power, a second lens component with negative power, a third lens component with positive power, a fourth lens component with positive power, and a fifth lens component with positive power and in which the first lens component has a prism for changing an optical path is known, and an example of this zoom lens is disclosed in Japanese Patent Kokai No. 2004-347712. Use of such a zoom lens realizes a variable magnification ratio of about 3 and favorable optical properties, and makes it possible to attain a slim design of a digital camera provided with the zoom lens.

SUMMARY OF THE INVENTION

A zoom lens according to the present invention, which changes a magnification by properly changing distances between a plurality of lens components, is characterized in that the zoom lens comprises, in order from the object side, a first lens component with positive power, a second lens component with negative power, a third lens component with positive power, a fourth lens component with positive power, and a fifth lens component with positive power; the first lens component has a reflecting member of changing an optical path; and the zoom lens satisfies the following conditions (1) and (2):

$$1.6 < \beta_2(t)/\beta_2(w) < 10.0 \quad (1)$$

$$3.3 < \beta_4(t)/\beta_4(w) < 10.0 \quad (2)$$

where $\beta_2(t)$ is a lateral magnification of the second lens component in a telephoto position in infinite focusing, $\beta_2(w)$ is a lateral magnification of the second lens component in a wide-angle position in infinite focusing, $\beta_4(t)$ is a lateral magnification of the fourth lens component in a telephoto position in infinite focusing, and $\beta_4(w)$ is a lateral magnification of the fourth lens component in a wide-angle position in infinite focusing.

The zoom lens according to the present invention preferably satisfies the following condition (3):

$$0.3 < |\phi_4/\phi_2| < 0.7 \quad (3)$$

where $\phi_2$ is a power of the second lens component, and $\phi_4$ is a power of the fourth lens component.

In the zoom lens according to the present invention, the reflecting member is preferably a prism, and the zoom lens preferably satisfies the following condition (4):

$$1 < D_p/ih_w < 5 \quad (4)$$

where $D_p$ is a length of the prism on the optical axis, and $ih_w$ is an image height in a wide-angle position.

In the zoom lens according to the present invention, the first lens component preferably comprises, in order from the objective side, a first lens component with negative power, a reflecting member of changing an optical path, and a second lens component with positive power.

The zoom lens according to the present invention preferably satisfies the following conditions (5) and (6) when the first lens component has the first lens element with negative power located at the most object-side position:

$$1.95 < n_{d1} < 2.1 \quad (5)$$

$$18 < v_{d1} < 30 \quad (6)$$

where $n_{d1}$ is the refractive index of the first lens element with negative power in the first lens component, and $v_{d1}$ is the Abbe's number of the first lens element with negative power in the first lens component.

The zoom lens according to the present invention preferably satisfies the following conditions (7):

$$3.5 < f_t/f_w < 7.0 \quad (7)$$

where $f_w$ is the focal length of the entire zoom lens system in a wide-angle position, and $f_t$ is the focal length of the entire zoom lens system in a telephoto position.

In the zoom lens according to the present invention, a positive lens element of the third lens component preferably comprises a single lens.

The image pickup apparatus according to the present invention is provided with the above zoom lens and a circuit electrically correcting distortion and/or chromatic aberration of magnification.

The present invention can offer a zoom lens which is small, has a high variable magnification ratio of about 5 to 7, and has excellent optical properties with respect to on-axis and off-axis aberrations. The present invention also offers an image pickup apparatus using the zoom lens.

These and other features and advantages of the present invention will become apparent from the detailed description of the preferred embodiments when taken in conjunction with accompanying drawings.

BRIEF DESCRIPTION OF THE DRAWINGS

FIGS. 2A-2D, 2E-2H, and 2I-2L are diagrams showing aberration characteristics in wide-angle, middle, and telephoto positions respectively, in infinite objective point focusing of the zoom lens shown in FIG. 1A-1C.

FIGS. 4A-4D, 4E-4H, and 4I-4L are diagrams showing aberration characteristics in wide-angle, middle, and telephoto positions respectively, in infinite objective point focusing of the zoom lens shown in FIG. 3A-3C.

FIGS. 6A-6D, 6E-6H, and 6I-6L are diagrams showing aberration characteristics in wide-angle, middle, and telephoto positions respectively, in infinite objective point focusing of the zoom lens shown in FIG. 5A-5C.

FIGS. 8A-8D, 8E-8H, and 8I-8L are diagrams showing aberration characteristics in wide-angle, middle, and telephoto positions respectively, in infinite objective point focusing of the zoom lens shown in FIG. 7A-7C.

FIGS. 16A, 16B, and 16C are views of showing one of a mobile phone, a front view showing the mobile phone, a side view showing the mobile phone, and a cross sectional view showing an image pickup apparatus incorporated into the mobile phone and the periphery of the image pickup apparatus, respectively.

DETAILED DESCRIPTION OF THE PREFERRED EMBODIMENTS

Figure 1A:
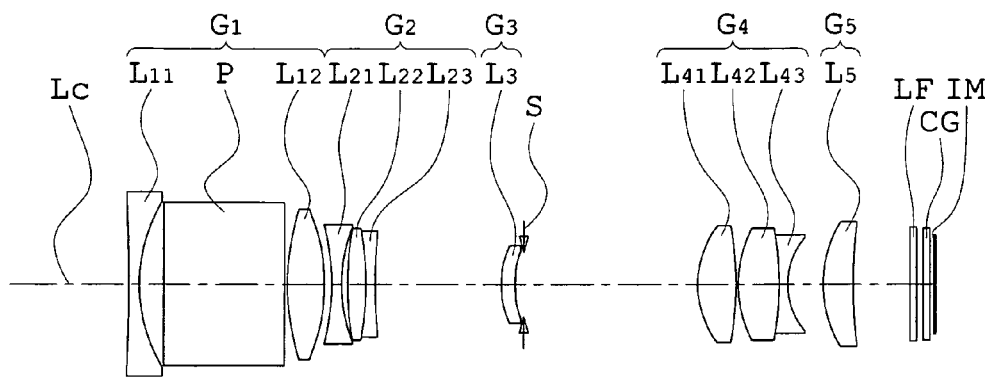
FIGS. 1A, 1B, and 1C are cross sectional views showing optical arrangements, developed along the optical axis, in wide-angle, middle, and telephoto positions, respectively, in infinite object point focusing of the zoom lens according to the first embodiment of the present invention.

Before undertaking the description of the embodiments of a zoom lens according to the present invention and an image pickup apparatus using the same, the function and effect by each constitution will be explained.

A zoom lens according to the present invention has, in order from the object side, a first lens component with positive power, a second lens component with negative power, a third lens component with positive power, a fourth lens component with positive power, and a fifth lens component with positive power. The zoom lens is designed in such a way that a magnification is changed by properly changing distances between the lens components, and the second and fourth lens components are mainly moved along the optical axis in changing the magnification.

In such an arrangement of the zoom lens, burdens on the second and fourth lens components in the magnification change must be properly related to each other. For example, when the burden on the second lens component is heavy in the magnification change, power and the amount of movement of the second lens component must be increased in order to secure a variable magnification ratio. However, such a large power of the second lens component is liable to mainly cause off-axis aberration. In addition, as a result of the increase of the amount of movement of the second lens component, air spacing between the second and third lens components must be increased in a wide-angle position, and the diameter of the first lens component becomes large.

Similarly, when the burden on the fourth lens component is heavy in the magnification change, power and the amount of movement of the fourth lens component must be increased in order to secure a variable magnification ratio. However, such a large power of the fourth lens component is liable to mainly cause on-axis aberration. In addition, as a result of the increase of the amount of movement of the fourth lens component, air spacing between the third and fourth lens components must be increased in the wide-angle position, and the total length also becomes large.

For this reason, a zoom lens according to the present invention is designed to satisfy the following conditions (1) and (2):

$$1.6 < \beta_2(t)/\beta_2(w) < 10.0 \quad (1)$$

$$3.3 < \beta_4(t)/\beta_4(w) < 10.0 \quad (2)$$

where $\beta_2(t)$ is a lateral magnification of the second lens component at a telephoto position in infinite focusing, $\beta_2(w)$ is a lateral magnification of the second lens component at a wide-angle position in infinite focusing, $\beta_4(t)$ is a lateral magnification of the fourth lens component at a telephoto position in infinite focusing, and $\beta_4(w)$ is a lateral magnification of the fourth lens component at a wide-angle position in infinite focusing.

The conditions (1) and (2) show a relation between lateral magnifications of the second and fourth lens components in changing a magnification from the wide-angle position to the telephoto position. If the zoom lens satisfies both of these conditions together, it is possible to avoid excessive burdens of the second and fourth lens components in a variable magnification. If the ratio $\beta_2(t)/\beta_2(w)$ is below the lower limit of the condition (1) or the ratio $\beta_4(t)/\beta_4(w)$ is below the lower limit of the condition (2), since burden sharing of one lens component in a variable magnification remarkably becomes light, the other lens component must be given a large variable magnification function. This case causes necessity to increase the amount of movement of the lens component given a large burden sharing in a variable magnification or to strengthen power of the lens component, and leads to an increase of the total length and occurrence of various off-axis or on-axis aberrations. Similarly, If the ratio $\beta_2(t)/\beta_2(w)$ is beyond the upper limit of the condition (1) or the ratio $\beta_4(t)/\beta_4(w)$ is beyond the upper limit of the condition (2), a variable magnification function of one lens component becomes too strong, causing an increase of the total length and producing various off-axis or on-axis aberrations. In addition, a diameter of a lens of the lens component becomes large.

The zoom lens according to the present invention is more preferably designed to satisfy the following condition (1)' or (1)" instead of the condition (1):

$$1.7 < \beta_2(t)/\beta_2(w) < 6.0 \quad (1)'$$

$$1.9 < \beta_2(t)/\beta_2(w) < 3.0 \quad (1)''$$

In addition, the upper limit or lower limit of the condition (1) may be replaced with the upper limit or lower limit of the condition (1)' or (1)", respectively. The upper limit or lower limit of the condition (1)' may be replaced with the upper limit or lower limit of the condition (1) or (1)", respectively.

The zoom lens according to the present invention is more preferably designed to satisfy the following condition (2)' or (2)" instead of the condition (2):

$$3.4 < \beta_4(t)/\beta_4(w) < 7.0 \quad (2)'$$

$$3.5 < \beta_4(t)/\beta_4(w) < 5.0 \quad (2)''$$

In addition, the upper limit or lower limit of the condition (2)' may be replaced with the upper limit or lower limit of the condition (2) or (2)", respectively. The upper limit or lower limit of the condition (2)" may be replaced with the upper limit or lower limit of the condition (2) or (2)', respectively.

The zoom lens according to the present invention is designed so that the first lens component has a reflecting member which change an optical path. The zoom lens according to the present invention is capable of changing an optical path in the first lens component, and is capable of attaining a slim design with respect to the direction along the optical axis of incidence even though the other lens components are moved to change the magnification, because such a constitution is adopted.

The zoom lens according to the present invention preferably satisfies the following condition (3):

$$0.3 < |\phi_4/\phi_2| < 0.7 \quad (3)$$

where $\phi_2$ is a power of the second lens component, and $\phi_4$ is a power of the fourth lens component.

The condition (3) is a condition regarding a share of power between the second and fourth lens components which are responsible for a variable magnification. If $|\phi_4/\phi_2|$ is below the lower limit of the condition (3) or beyond the upper limit of the condition (3), since power of one lens component becomes too increased, a large on-axis or off-axis aberration is easy to occur.

The zoom lens according to the present invention is more preferably designed to satisfy the following condition (3)' or (3)" instead of the condition (3):

$$0.35 < |\phi_4/\phi_2| < 0.65 \quad (3)'$$

$$0.39 < |\phi_4/\phi_2| < 0.61 \quad (3)''$$

In addition, the upper limit or lower limit of the condition (3)' may be replaced with the upper limit or lower limit of the condition (3) or (3)", respectively. The upper limit or lower limit of the condition (3)" may be replaced with the upper limit or lower limit of the condition (3) or (3)', respectively.

In the zoom lens according to the present invention, the reflecting member is preferably a prism, and the zoom lens preferably satisfies the following condition (4):

$$1 < D_p/ih_w < 5 \quad (4)$$

where $D_p$ is a length of the prism on the optical axis, and $ih_w$ is an image height at a wide-angle position.

The condition (4) is a condition for arranging the prism, which changes an optical path, in the zoom lens without difficulty. If $D_p/ih_w$ is below the lower limit of the condition (4), the amount of ambient light remarkably decreases, which is unfavorable. On the other hand, if $D_p/ih_w$ is beyond the upper limit of the condition (4), the total length becomes long.

The zoom lens according to the present invention is more preferably designed to satisfy the following condition (4)' or (4)" instead of the condition (4):

$$1.5 < D_p/ih_w < 4 \quad (4)'$$

$$2.5 < D_p/ih_w < 3.5 \quad (4)''$$

In addition, the upper limit or lower limit of the condition (4)' may be replaced with the upper limit or lower limit of the condition (4) or (4)", respectively. The upper limit or lower limit of the condition (4)" may be replaced with the upper limit or lower limit of the condition (4) or (4)', respectively.

In the zoom lens according to the present invention, the first lens component preferably has, in order from the object side, a first lens element with negative power, a reflecting member which changes an optical path, and a second lens element with positive power. This constitution makes the effective diameter small, and an aberration, especially an off-axis aberration in wide-angle position, is easily corrected well with the first lens component having sufficient power.

The zoom lens according to the present invention preferably satisfies the following conditions (5) and (6):

$$1.95 < n_{d1} < 2.1 \quad (5)$$

$$18 < v_{d1} < 30 \quad (6)$$

where $n_{d1}$ is the refractive index of the first lens element with negative power in the first lens component, and $v_{d1}$ is the Abbe's number of the first lens element with negative power in the first lens component.

The conditions (5) and (6) define a condition for suppressing an aberration and for shortening the total length of the zoom lens while securing the power of the negative lens element located at the most object-side position in the first lens component. If $n_{d1}$ is below the lower limit of the condition (5), the radius of curvature of the negative lens element located at the most object-side position in the first lens component becomes small, and an off-axis aberration is easy to occur. On the other hand, if $n_{d1}$ is beyond the upper limit of the condition (5), it becomes hard to get a glass material for making the negative lens element located at the most object-side position in the first lens component, which leads to a raise in cost and deterioration of a mass productivity. If $v_{d1}$ is below the lower limit of the condition (6) or beyond the upper limit of the condition (6) with the condition (5) satisfied, it becomes hard to get a glass material for making the negative lens element located at the most object-side position in the first lens component, which leads to a raise in cost and deterioration of a mass productivity.

The zoom lens according to the present invention preferably satisfies the following conditions (7):

$$3.5 < f_t/f_w < 7.0 \quad (7)$$

where $f_w$ is the focal length of the entire zoom lens system in a wide-angle position, and $f_t$ is the focal length of the entire zoom lens system in a telephoto position.

The condition (7) is a condition regarding a variable magnification ratio. If $f_t/f_w$ is beyond the upper limit of the condition (7), the total length is apt to be increase in the wide-angle position and in the telephoto position. If $f_t/f_w$ is below the lower limit of the condition (7), a desired variable magnification cannot be obtained. In the zoom lens according to the present invention, the lens element with positive power in the third lens component consists of a single lens. This constitution easily prevents increase of the total length of the third lens component and the zoom lens, and easily contributes to cost cut.

In the zoom lens according to the present invention, it is preferable that the total length dose not change and an aperture stop does not move in changing the magnification. Since such a constitution makes the number of driving parts in the zoom lens decrease, the zoom lens becomes easy to be produced.

An image pickup apparatus according to the present invention is designed to have the above zoom lens and a circuit electrically correcting a distortion and/or chromatic aberration of magnification. Such a constitution, which is capable of accepting a distortion in the zoom lens, reduces the number of lenses in the zoom lens and makes it easy to downsize the zoom lens. In addition, an electric correction of a chromatic aberration of magnification makes it possible to reduce color blur in a photographed image and makes an improvement in resolving power.

The embodiments 1 to 4 according to the present invention will be explained below with the diagrams referred to.

Subscript numerals in $r_1, r_2, \ldots$ and $d_1, d_2, \ldots$ in cross sectional views of the optical system in the diagrams correspond to surface numbers, 1, 2, . . . in numerical data, respectively. In views showing aberration curves, $\Delta M$ in views of astigmatism denotes astigmatism in a meridional surface, and $\Delta S$ in views of astigmatism denotes astigmatism in a sagittal surface. In this case, a meridional surface is a surface in which the optical axis of an optical system and a principal ray are included (, or a surface parallel to the surface of a paper sheet). A sagittal surface is a surface perpendicular to a surface in which the optical axis of an optical system and a principal ray are included (, or a surface perpendicular to the surface of a paper sheet).

In the numerical data for lenses in each of the following embodiments, R denotes the radius of curvature of each surface, D denotes spacing between the surfaces, Nd denotes the refractive index relating to the d line, vd denotes the Abbe's number relating to the d line, K denotes a conic constant, and $A_4, A_6, A_8,$ and $A_{10}$ denote an aspherical coefficient. In addition, the configuration of each aspherical surface is expressed by the following equation with aspherical coefficients for each embodiment:

$$Z=(Y^2/r)/[1+\{1-(1+K)(Y/r)^2\}^{1/2}]+A_4Y^4+A_6Y^6+A_8Y^8+A_{10}Y^{10}+\ldots$$

where, Z is taken as a coordinate in the direction along the optical axis, and Y is taken as a coordinate in the direction perpendicular to the optical axis.

First Embodiment

Figure 1B:
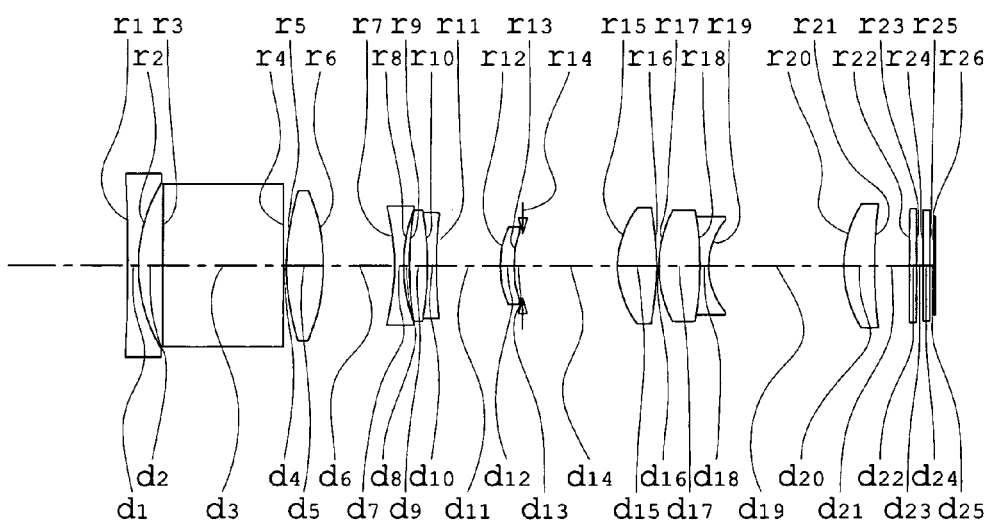
Figure 1C:
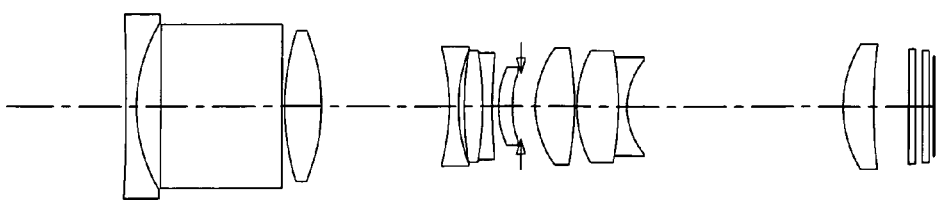

FIGS. 1A, 1B, and 1C are cross sectional views showing optical arrangements, developed along the optical axis, in wide-angle, middle, and telephoto positions, respectively, in infinite object point focusing of the zoom lens according to the first embodiment of the present invention. FIGS. 2A-2D, 2E-2H, and 2I-2L are diagrams showing aberration characteristics in wide-angle, middle, and telephoto positions respectively, in infinite objective point focusing of the zoom lens shown in FIGS. 1A-1C.

First, the optical arrangement according to the first embodiment will be explained with FIGS. 1A, 1B, and 1C. A zoom lens according to the present embodiment comprises, in order from the object side, a first lens component $G_1$ with positive power, a second lens component $G_2$ with negative power, a third lens component $G_3$ with positive power, a fourth lens component $G_4$ with positive power, and a fifth lens component $G_5$ with positive power, and the lens components are arranged on the optical axis Lc. An aperture stop S, which is integrated with the lens component $G_3$, is arranged between the lens component $G_3$ and the lens component $G_4$. A low-pass filter LF, a CCD cover grass CG, and a CCD with an imaging plane IM are arranged in this order from the object side on the image side of the fifth lens component $G_5$.

The first lens component $G_1$ comprises: a first lens element $L_{11}$ which is a biconcave lens and has negative power; a prism P which is a reflecting member of changing an optical path; and a second lens element $L_{12}$ which has positive power and is a biconvex lens whose both surfaces are aspherical. The lens elements $L_{11}$, the prism P, and the lens element $L_{12}$ are arranged in this order from the object side.

The second lens component $G_2$ comprises: a first lens element $L_{21}$ which has negative power and is a biconcave lens whose both surfaces are aspherical; and a cemented lens consisting of a second lens element $L_{22}$ which is a biconvex lens and has positive power and a third lens element $L_{23}$ which is a biconcave lens and has negative power. The lens elements $L_{21}, L_{22},$ and $L_{23}$ are arranged in this order from the object side.

The third lens component $G_3$ comprises only a lens element $L_3$ with positive power. The lens element $L_3$ is a meniscus lens whose both surfaces are aspherical and whose convex surface faces to the object side.

The fourth lens component $G_4$ comprises: a fourth lens element $L_{41}$ which has positive power and is a biconvex lens whose both surfaces are aspherical; and a cemented lens consisting of a second lens element $L_{42}$ which is a biconvex lens and has positive power and a third lens element $L_{43}$ which is a biconcave lens and has negative power.

The fifth lens component $G_5$ comprises only a lens element $L_5$ with positive power. The lens element $L_5$ is a meniscus lens whose convex surface faces to the object side.

In changing a magnification from the wide-angle position to the telephoto position, the first lens component $G_1$ does not move on the optical axis Lc. The second lens component $G_2$ moves to the image side on the optical axis Lc with a distance between the first lens component $G_1$ and the second lens component $G_2$ being widen. The third lens component $G_3$ does not move on the optical axis Lc. The fourth lens component $G_4$ moves to the object side on the optical axis Lc with a distance between the third lens component $G_3$ and the fourth lens component $G_4$ being narrowed. The fifth lens component $G_5$ moves on the optical axis Lc in such a way that a distance between the fourth lens component $G_4$ and the fifth lens component $G_5$ is widen. The aperture stop S does not move on the optical axis Lc because the aperture stop S is integrated with the lens component $G_3$.

The lens arrangement and the numerical data of the first embodiment according to the present invention are as follows, where a unit of length used in the data is millimeter (mm), R denotes a radius of curvature, D denotes a spacing between surfaces, Nd denotes a refractive index, vd denotes the Abbe's number, K denotes a conic constant, and $A_4, A_6, A_8,$ and $A_{10}$ denote aspherical coefficients:

Surface data

| Surface No. | R | D | Nd | νd |
|---|---|---|---|---|
| 1 | −159.447 | 0.80 | 2.00069 | 25.46 |
| 2 | 12.734 | 1.85 | | |
| 3 | ∞ | 9.15 | 1.90366 | 31.32 |
| 4 | ∞ | 0.20 | | |
| 5 (aspherical surface) | 21.062 | 2.80 | 1.76802 | 49.24 |
| 6 (aspherical surface) | −14.867 | D6 | | |
| 7 (aspherical surface) | −16.426 | 0.69 | 1.83481 | 42.71 |
| 8 (aspherical surface) | 11.811 | 0.44 | | |
| 9 | 27.619 | 1.40 | 1.92286 | 20.88 |
| 10 | −25.129 | 0.70 | 1.88300 | 40.76 |
| 11 | 39.277 | D11 | | |
| 12 (aspherical surface) | 7.705 | 1.04 | 1.59551 | 39.24 |
| 13 (aspherical surface) | 13.397 | 0.66 | | |
| 14 (aperture stop) | ∞ | D14 | | |
| 15 (aspherical surface) | 8.505 | 2.95 | 1.49700 | 81.54 |
| 16 (aspherical surface) | −17.023 | 0.15 | | |
| 17 | 9.405 | 3.13 | 1.75700 | 47.82 |
| 18 | −24.712 | 0.64 | 2.00330 | 28.27 |
| 19 | 5.684 | D19 | | |
| 20 | 9.391 | 2.30 | 1.52249 | 59.84 |
| 21 | 38.786 | D21 | | |
| 22 | ∞ | 0.50 | 1.54771 | 62.84 |
| 23 | ∞ | 0.50 | | |
| 24 | ∞ | 0.50 | 1.51633 | 64.14 |
| 25 | ∞ | 0.37 | | |
| 26 (imaging plane) | ∞ | | | |

Aspherical surface data

| Surface No. | R | K | $A_4$ | $A_6$ | $A_8$ | $A_{10}$ |
|---|---|---|---|---|---|---|
| 5 | 21.062 | 0.000 | −1.18078e−05 | −1.90391e−06 | 8.99387e−08 | −1.76200e−09 |
| 6 | −14.867 | 0.000 | 7.65238e−05 | −1.74543e−06 | 8.30719e−08 | −1.62841e−09 |
| 7 | −16.426 | 0.000 | 2.78488e−04 | −1.18575e−05 | 3.97423e−07 | −6.09139e−09 |
| 8 | 11.811 | 0.000 | 1.31584e−05 | −9.91138e−06 | 1.93868e−07 | |
| 12 | 7.705 | 0.000 | 2.89672e−04 | 2.36998e−06 | 9.78844e−07 | |
| 13 | 13.397 | 0.000 | 6.53762e−04 | 2.72922e−06 | 1.51791e−06 | |
| 15 | 8.505 | 0.000 | −1.12708e−04 | 7.45314e−06 | −4.75456e−07 | 2.59125e−08 |
| 16 | −17.023 | 0.000 | 2.39159e−04 | 9.88823e−06 | −6.26792e−07 | 3.45650e−08 |

Various data

Zoom ratio 4.72

| | Wide-angle position | Middle position | Telephoto position |
|---|---|---|---|
| Focal length | 5.13 | 11.03 | 24.20 |
| F-number | 3.51 | 4.88 | 6.00 |
| Angle of view | 82.70 | 37.99 | 17.71 |
| Image height | 3.84 | 3.84 | 3.84 |
| Total length of the zoom lens | 60.61 | 60.61 | 60.61 |
| back focus | 5.72 | 4.12 | 4.12 |
| D6 | 0.60 | 5.40 | 9.74 |
| D11 | 9.64 | 4.84 | 0.50 |
| D14 | 13.07 | 7.09 | 1.05 |
| D19 | 2.70 | 10.28 | 16.33 |
| D21 | 4.20 | 2.60 | 2.60 |

Lens component data for the zoom lens

| Lens component number | Object-side surface of a lens component | Focal length |
|---|---|---|
| 1 | 1 | 17.56 |
| 2 | 7 | −8.97 |
| 3 | 12 | 28.52 |
| 4 | 15 | 19.40 |
| 5 | 20 | 23.09 |

Data regarding the above condition in the first embodiment

Condition (1) (or $1.6 < \beta_2(t)/\beta_2(w) < 10.0$): $\beta_2(t)/\beta_2(w) = 1.96$
Condition (2) (or $3.3 < \beta_4(t)/\beta_4(w) < 10.0$): $\beta_4(t)/\beta_4(w) = 4.41$
Condition (3) (or $0.3 < |\phi_4/\phi_2| < 0.7$): $|\phi_4/\phi_2| = 0.46$ -continued Condition (4) (or $1 < D_p/ih_w < 5$): $D_p/ih_w = 2.38$
Condition (5) (or $1.95 < n_{d1} < 2.1$): $n_{d1} = 2.00$
Condition (6) (or $18 < \nu_{d1} < 30$): $\nu_{d1} = 25.46$
Condition (7) (or $3.5 < f_t/f_w < 7.0$): $f_t/f_w = 4.72$ Subsequently, an image pickup apparatus having a zoom lens according to the present invention will be explained in the case that the apparatus has a circuit of electrically correcting distortion. In the zoom lens for the image pickup apparatus according to the present embodiment, barrel distortion occurs on a photoelectric conversion surface of a CCD in the wide-angle position. On the other hand, such a distortion does not occur too much around the middle position and in the telephoto position. For this reason, the image pickup apparatus with a zoom lens according to the present invention is designed in such a way that an effective imaging region is formed into a barrel shape in the wide-angle position and is formed into a rectangular shape around the middle position and in the telephoto position in order to correct distortion. Barrel-shaped image data obtained in the wide-angle position is converted into rectangle-shaped image information in which distortion is reduced, by an electric image processing, and the image information is recorded or indicated.

The image pickup apparatus according to the present invention is designed in such a way that the image height in the wide-angle position is smaller than the image height around the middle position and in the telephoto position. In addition, the image pickup apparatus according to the present invention is designed in such a way that the short sides of the photoelectric conversion surface are as long as the short sides of the effective imaging region, and the effective imaging region is defined in such a way that distortion of about −3% remains after an image processing. Naturally, an effective imaging region that is smaller than the above effective imaging region may be defined to use an image which is converted into rectangle as an image for record or a playback.

Numerical data in the first embodiment in the case that distortion is electrically corrected are as follows, where data which are not shown below have the same value as the above data in the case that distortion is not electrically corrected, and a unit of length used in the data is millimeter (mm):

| Various data in the case that distortion is electrically corrected | | |
|---|---|---|
| Zoom ratio | | 6.72 |
| | Wide-angle position | Middle position | Telephoto position |
| Angle of view | 78.56 | 37.99 | 17.71 |
| Image height | 3.63 | 3.84 | 3.84 |

Figure 3A:
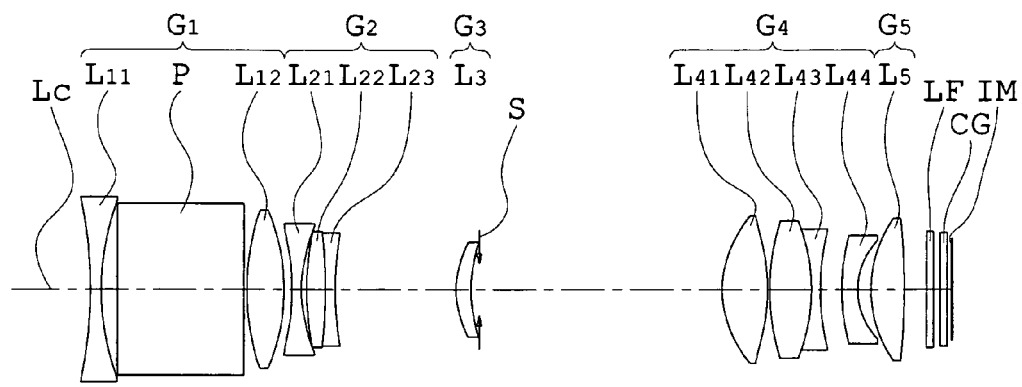
FIGS. 3A, 3B, and 3C are cross sectional views showing optical arrangements, developed along the optical axis, in wide-angle, middle, and telephoto positions, respectively, in infinite object point focusing of the zoom lens according to the second embodiment of the present invention.
Figure 3B:
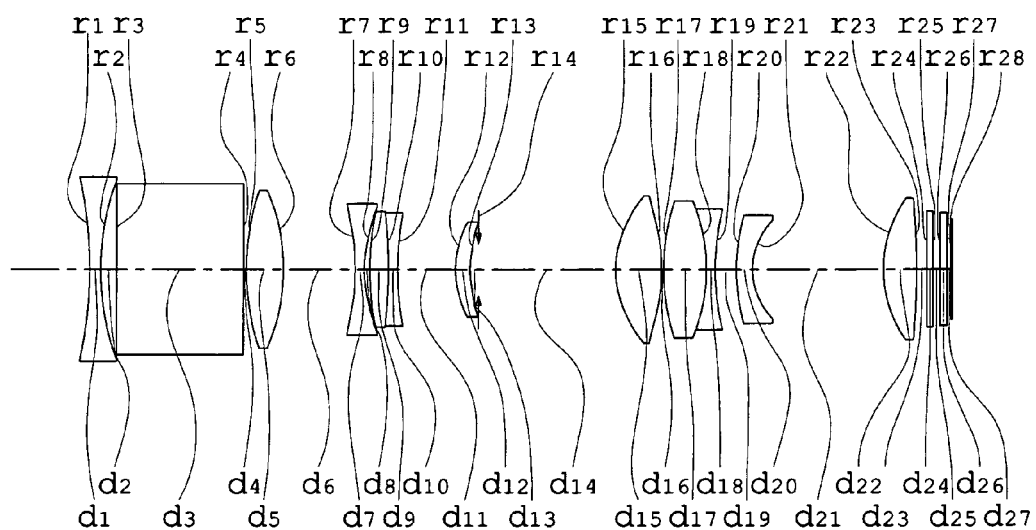
Figure 3C:
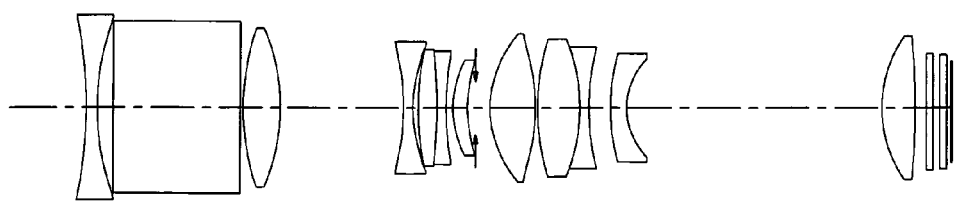

Data regarding the above condition in the first embodiment in the case that distortion is electrically corrected Condition (1) (or $1.6 < \beta_2(t)/\beta_2(w) < 10.0$): $\beta_2(t)/\beta_2(w) = 1.96$
Condition (2) (or $3.3 < \beta_4(t)/\beta_4(w) < 10.0$): $\beta_4(t)/\beta_4(w) = 4.41$
Condition (3) (or $0.3 < |\phi_4/\phi_2| < 0.7$): $|\phi_4/\phi_2| = 0.46$
Condition (4) (or $1 < D_p/ih_w < 5$): $D_p/ih_w = 2.52$
Condition (5) (or $1.95 < n_{d1} < 2.1$): $n_{d1} = 2.00$
Condition (6) (or $18 < \nu_{d1} < 30$): $\nu_{d1} = 25.46$
Condition (7) (or $3.5 < f_t/f_w < 7.0$): $f_t/f_w = 4.72$ Second Embodiment FIGS. 3A, 3B, and 3C are cross sectional views showing optical arrangements, developed along the optical axis, in wide-angle, middle, and telephoto positions, respectively, in infinite object point focusing of the zoom lens according to the second embodiment of the present invention. FIGS. 4A-4D, 4E-4H, and 4I-4L are diagrams showing aberration characteristics in wide-angle, middle, and telephoto positions respectively, in infinite objective point focusing of the zoom lens shown in FIGS. 3A-3C.

First, the optical arrangement according to the second embodiment will be explained with FIGS. 3A, 3B, and 3C. A zoom lens according to the present embodiment comprises, in order from the object side, a first lens component $G_1$ with positive power, a second lens component $G_2$ with negative power, a third lens component $G_3$ with positive power, a fourth lens component $G_4$ with positive power, and a fifth lens component $G_5$ with positive power, and the lens components are arranged on the optical axis Lc. An aperture stop S, which is integrated with the lens component $G_3$, is arranged between the lens component $G_3$ and the lens component $G_4$. A low-pass filter LF, a CCD cover grass CG and a CCD with an imaging plane IM are arranged in this order from the object side on the image side of the fifth lens component $G_5$.

The first lens component $G_1$ comprises: a first lens element $L_{11}$ which is a biconcave lens and has negative power; a prism P which is a reflecting member of changing an optical path; and a second lens element $L_{12}$ which has positive power and is a biconvex lens whose both surfaces are aspherical. The lens elements $L_{11}$, the prism P, and the lens element $L_{12}$ are arranged in this order from the object side.

The second lens component $G_2$ comprises: a first lens element $L_{21}$ which has negative power and is a biconcave lens whose both surfaces are aspherical; and a cemented lens consisting of a second lens element $L_{22}$ which is a biconvex lens and has positive power and a third lens element $L_{23}$ which is a biconcave lens and has negative power. The lens elements $L_{21}$, $L_{22}$, and $L_{23}$ are arranged in this order from the object side.

The third lens component $G_3$ comprises only a lens element $L_3$ with positive power. The lens element $L_3$ is a meniscus lens whose both surfaces are aspherical and whose convex surface faces to the object side.

The fourth lens component $G_4$ comprises: a fourth lens element $L_{41}$ which has positive power and is a biconvex lens whose both surfaces are aspherical; a cemented lens consisting of a second lens element $L_{42}$ which is a biconvex lens and has positive power and a third lens element $L_{43}$ which is a biconcave lens and has negative power; and a lens element $L_{44}$ which has negative power, where the lens element $L_{44}$ is a meniscus lens whose convex surface faces to the object side.

The fifth lens component $G_5$ comprises only a lens element $L_5$ which is a biconvex lens and has positive power.

In changing a magnification from the wide-angle position to the telephoto position, the first lens component $G_1$ does not move on the optical axis Lc. The second lens component $G_2$ moves to the image side on the optical axis Lc with a distance between the first lens components $G_1$ and the second lens component $G_2$ being widen. The third lens component $G_3$ does not move on the optical axis Lc. The fourth lens component $G_4$ moves to the object side on the optical axis Lc with a distance between the third lens component $G_3$ and the fourth lens component $G_4$ being narrowed. The fifth lens component $G_5$ moves on the optical axis Lc in such a way that a distance between the fourth lens component $G_4$ and the fifth lens component $G_5$ is widen. The aperture stop S does not move on the optical axis Lc because the aperture stop S is integrated with the lens component $G_3$.

The lens arrangement and the numerical data of the second embodiment according to the present invention are as follows, where a unit of length used in the data is millimeter (mm), R denotes a radius of curvature, D denotes a spacing between surfaces, Nd denotes a refractive index, vd denotes the Abbe's number, K denotes a conic constant, and $A_4$, $A_6$, $A_8$, and $A_{10}$ denote aspherical coefficients:

Surface data

| Surface No. | R | D | Nd | vd |
|---|---|---|---|---|
| 1 | −34.040 | 0.80 | 2.00069 | 25.46 |
| 2 | 20.017 | 1.19 | | |
| 3 | ∞ | 9.40 | 1.90366 | 31.32 |
| 4 | ∞ | 0.20 | | |
| 5 (aspherical surface) | 20.991 | 2.80 | 1.77250 | 49.60 |
| 6 (aspherical surface) | −13.950 | D6 | | |
| 7 (aspherical surface) | −16.407 | 0.69 | 1.83481 | 42.71 |
| 8 (aspherical surface) | 11.117 | 0.42 | | |
| 9 | 22.308 | 1.40 | 1.92286 | 20.88 |
| 10 | −39.865 | 0.70 | 1.88300 | 40.76 |
| 11 | 25.377 | D11 | | |
| 12 (aspherical surface) | 7.853 | 1.11 | 1.59270 | 35.31 |
| 13 (aspherical surface) | 13.221 | 0.63 | | |
| 14 (aperture stop) | ∞ | D14 | | |
| 15 (aspherical surface) | 7.965 | 3.40 | 1.49700 | 81.54 |
| 16 (aspherical surface) | −13.575 | 0.15 | | |
| 17 | 18.002 | 3.13 | 1.75700 | 47.82 |
| 18 | −13.901 | 0.64 | 2.00330 | 28.27 |
| 19 | 19.420 | 1.59 | | |
| 20 | 15.810 | 1.20 | 1.88300 | 40.76 |
| 21 | 5.413 | D21 | | |
| 22 | 9.670 | 2.47 | 1.51823 | 58.90 |
| 23 | −57.515 | D23 | | |
| 24 | ∞ | 0.50 | 1.54771 | 62.84 |
| 25 | ∞ | 0.50 | | |
| 26 | ∞ | 0.50 | 1.51633 | 64.14 |
| 27 | ∞ | 0.37 | | |
| 28 (imaging plane) | ∞ | | | |

Aspherical surface data

| Surface No. | R | K | $A_4$ | $A_6$ | $A_8$ | $A_{10}$ |
|---|---|---|---|---|---|---|
| 5 | 20.991 | 0.000 | −1.26885e−05 | −3.88277e−07 | 2.89538e−08 | −8.31662e−10 |
| 6 | −13.950 | 0.000 | 1.16300e−04 | −4.54516e−07 | 2.99407e−08 | −8.09645e−10 |
| 7 | −16.407 | 0.000 | 3.00514e−04 | −9.16469e−06 | 1.65600e−07 | −2.23444e−09 |
| 8 | 11.177 | 0.000 | −1.78285e−05 | −7.64955e−06 | −2.75532e−08 | |
| 12 | 7.853 | 0.000 | −1.92908e−04 | 7.86589e−06 | −1.34431e−06 | |
| 13 | 13.221 | 0.000 | 9.67685e−05 | 1.09082e−05 | −1.35601e−06 | |
| 15 | 7.965 | 0.000 | −2.61562e−04 | 9.01262e−07 | −7.95652e−08 | 6.17247e−10 |
| 16 | −13.575 | 0.000 | 2.20142e−04 | 1.96196e−06 | −8.50929e−08 | 1.30736e−09 |

Various data

| | Zoom ratio | | 6.72 |
|---|---|---|---|

| | Wide-angle position | Middle position | Telephoto position |
|---|---|---|---|
| Focal length | 5.13 | 13.23 | 34.45 |
| F-number | 3.51 | 5.55 | 6.00 |
| Angle of view | 82.83 | 31.37 | 12.48 |
| Image height | 3.84 | 3.84 | 3.84 |
| Total length of the zoom lens | 65.65 | 65.65 | 65.65 |
| back focus | 5.02 | 4.11 | 4.12 |
| D6 | 0.60 | 5.36 | 9.21 |
| D11 | 9.11 | 4.35 | 0.50 |
| D14 | 17.98 | 10.16 | 1.05 |
| D21 | 1.00 | 9.75 | 18.86 |
| D23 | 3.53 | 2.59 | 2.60 |

-continued

| Lens component data for the zoom lens | | |
|---|---|---|
| Lens component number | Object-side surface of a lens component | Focal length |
| 1 | 1 | 16.11 |
| 2 | 7 | −8.20 |
| 3 | 12 | 30.29 |
| 4 | 15 | 18.61 |
| 5 | 22 | 16.18 |

Data regarding the above condition in the first embodiment

Condition (1) (or $1.6 < \beta_2(t)/\beta_2(w) < 10.0$): $\beta_2(t)/\beta_2(w) = 2.20$
Condition (2) (or $3.3 < \beta_4(t)/\beta_4(w) < 10.0$): $\beta_4(t)/\beta_4(w) = 3.96$
Condition (3) (or $0.3 < |\phi_4/\phi_2| < 0.7$): $|\phi_4/\phi_2| = 0.44$
Condition (4) (or $1 < D_p/ih_w < 5$): $D_p/ih_w = 2.45$
Condition (5) (or $1.95 < n_{d1} < 2.1$): $n_{d1} = 2.00$
Condition (6) (or $18 < \nu_{d1} < 30$): $\nu_{d1} = 25.46$
Condition (7) (or $3.5 < f_t/f_w < 7.0$): $f_t/f_w = 6.72$ Numerical data in the second embodiment in the case that distortion is electrically corrected are as follows, where data which are not shown below have the same value as the above data in the case that distortion is not electrically corrected, and a unit of length used in the data is millimeter (mm):

| Various data in the case that distortion is electrically corrected | | | |
|---|---|---|---|
| Zoom ratio | | 6.72 | |
| | Wide-angle position | Middle position | Telephoto position |
| Angle of view | 78.58 | 31.37 | 12.48 |
| Image height | 3.62 | 3.84 | 3.84 |

Figure 5A:
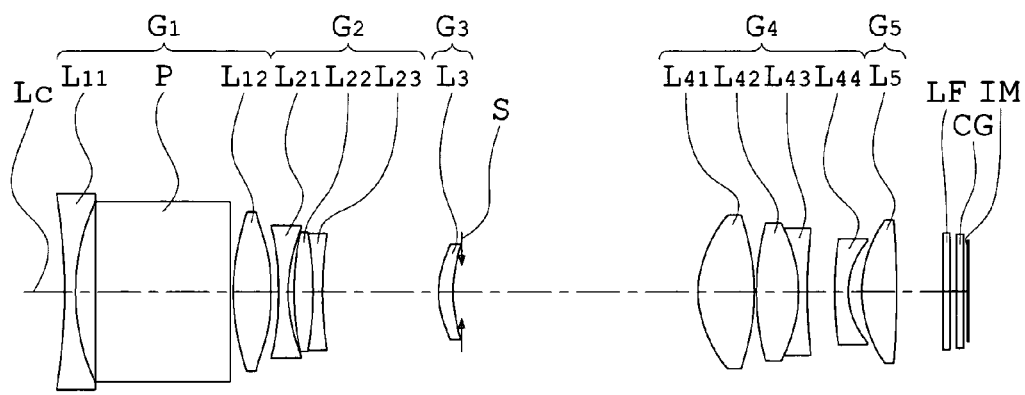
FIGS. 5A, 5B, and 5C are cross sectional views showing optical arrangements, developed along the optical axis, in wide-angle, middle, and telephoto positions, respectively, in infinite object point focusing of the zoom lens according to the third embodiment of the present invention.
Figure 5B:
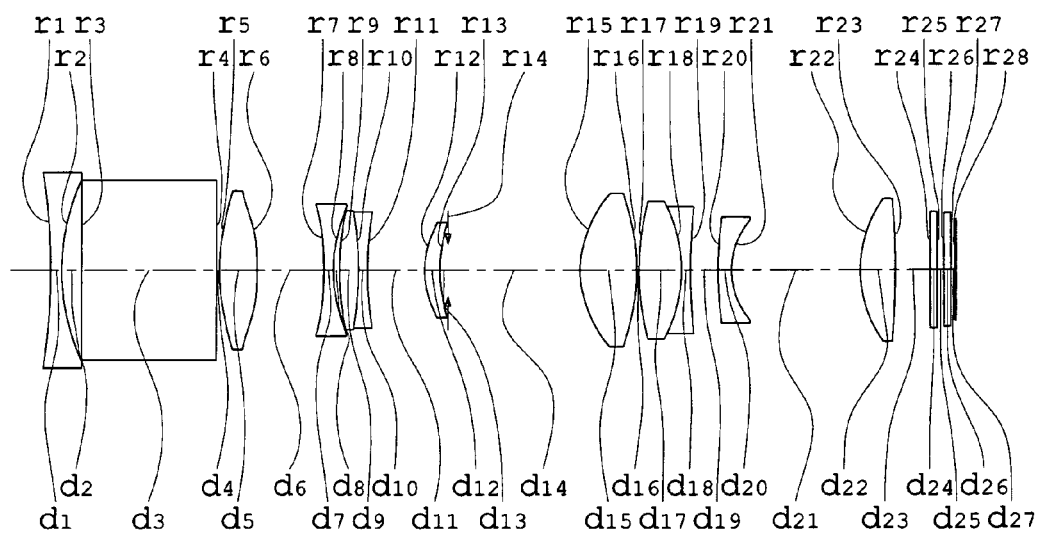
Figure 5C:
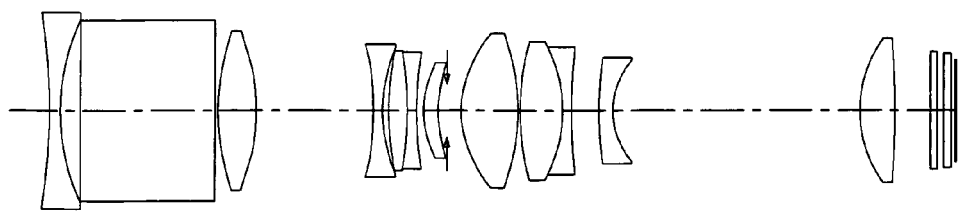

Data regarding the above condition in the first embodiment in the case that distortion is corrected Condition (1) (or $1.6 < \beta_2(t)/\beta_2(w) < 10.0$): $\beta_2(t)/\beta_2(w) = 2.20$
Condition (2) (or $3.3 < \beta_4(t)/\beta_4(w) < 10.0$): $\beta_4(t)/\beta_4(w) = 3.96$
Condition (3) (or $0.3 < |\phi_4/\phi_2| < 0.7$): $|\phi_4/\phi_2| = 0.44$
Condition (4) (or $1 < D_p/ih_w < 5$): $D_p/ih_w = 2.59$
Condition (5) (or $1.95 < n_{d1} < 2.1$): $n_{d1} = 2.00$
Condition (6) (or $18 < \nu_{d1} < 30$): $\nu_{d1} = 25.46$
Condition (7) (or $3.5 < f_t/f_w < 7.0$): $f_t/f_w = 6.72$ Third Embodiment FIGS. 5A, 5B, and 5C are cross sectional views showing optical arrangements, developed along the optical axis, in wide-angle, middle, and telephoto positions, respectively, in infinite object point focusing of the zoom lens according to the third embodiment of the present invention. FIGS. 6A-6D, 6E-6H, and 6I-6L are diagrams showing aberration characteristics in wide-angle, middle, and telephoto positions respectively, in infinite objective point focusing of the zoom lens shown in FIGS. 5A-5C.

First, the optical arrangement according to the third embodiment will be explained with FIGS. 5A, 5B, and 5C. A zoom lens according to the present embodiment comprises, in order from the object side, a first lens component $G_1$ with positive power, a second lens component $G_2$ with negative power, a third lens component $G_3$ with positive power, a fourth lens component $G_4$ with positive power, and a fifth lens component $G_5$ with positive power, and the lens components are arranged on the optical axis Lc. An aperture stop S, which is integrated with the lens component $G_3$, is arranged between the lens component $G_3$ and the lens component $G_4$. A low-pass filter LF, a CCD cover grass CG, and a CCD with an imaging plane IM are arranged in this order from the object side on the image side of the fifth lens component $G_5$.

The first lens component $G_1$ comprises: a first lens element $L_{11}$ which is a biconcave lens and has negative power; a prism P which is a reflecting member of changing an optical path; and a second lens element $L_{12}$ which has positive power and is a biconvex lens whose both surfaces are aspherical. The lens elements $L_{11}$, the prism P, and the lens element $L_{12}$ are arranged in this order from the object side.

The second lens component $G_2$ comprises: a first lens element $L_{21}$ which has negative power and is a biconcave lens whose both surfaces are aspherical; and a cemented lens consisting of a second lens element $L_{22}$ which is a biconvex lens and has positive power and a third lens element $L_{23}$ which is a biconcave lens and has negative power. The lens elements $L_{21}$, $L_{22}$, and $L_{23}$ are arranged in this order from the object side.

The third lens component $G_3$ comprises only a lens element $L_3$ with positive power. The lens element $L_3$ is a meniscus lens whose both surfaces are aspherical and whose convex surface faces to the object side.

The fourth lens component $G_4$ comprises: a fourth lens element $L_{41}$ which has positive power and is a biconvex lens whose both surfaces are aspherical; a cemented lens consisting of a second lens element $L_{42}$ which is a biconvex lens and has positive power and a third lens element $L_{43}$ which is a biconcave lens and has negative power; and a lens element $L_{44}$ which has negative power, where the lens element $L_{44}$ is a meniscus lens whose convex surface faces to the object side.

The fifth lens component $G_5$ comprises only a lens element $L_5$ which is a biconvex lens and has positive power.

In changing a magnification from the wide-angle position to the telephoto position, the first lens component $G_1$ does not move on the optical axis Lc. The second lens component $G_2$ moves to the image side on the optical axis Lc with a distance between the first lens components $G_1$ and the second lens component $G_2$ being widen. The third lens component $G_3$ reciprocates on the optical axis Lc in such a way that the third lens component $G_3$ first moves to the image side with a distance between the second lens component $G_2$ and then the third lens component $G_3$ being narrowed and then the third lens component $G_3$ moves to the object side. The fourth lens component $G_4$ moves to the object side on the optical axis Lc with a distance between the third lens component $G_3$ and the fourth lens component $G_4$ being narrowed. The fifth lens component $G_5$ moves on the optical axis Lc in such a way that a distance between the fourth lens component $G_4$ and the fifth lens component $G_5$ is widen. The aperture stop S does not move on the optical axis Lc because the aperture stop S is integrated with the lens component $G_3$.

The lens arrangement and the numerical data of the third embodiment according to the present invention are as follows, where a unit of length used in the data is millimeter (mm), R denotes a radius of curvature, D denotes a spacing between surfaces, Nd denotes a refractive index, νd denotes the Abbe's number, K denotes a conic constant, and $A_4$, $A_6$, $A_8$, and $A_{10}$ denote aspherical coefficients:

| Surface data | | | | |
|---|---|---|---|---|
| Surface No. | R | D | Nd | νd |
| 1 | −48.541 | 0.80 | 2.00069 | 25.46 |
| 2 | 16.832 | 1.48 | | |
| 3 | ∞ | 10.00 | 1.90366 | 31.32 |
| 4 | ∞ | 0.20 | | |
| 5 (aspherical surface) | 18.089 | 2.80 | 1.72916 | 54.68 |
| 6 (aspherical surface) | −13.688 | D6 | | |
| 7 (aspherical surface) | −15.666 | 0.69 | 1.83481 | 42.71 |
| 8 (aspherical surface) | 10.420 | 0.48 | | |
| 9 | 22.849 | 1.40 | 1.92286 | 20.88 |
| 10 | −26.825 | 0.70 | 1.88300 | 40.76 |
| 11 | 28.091 | D11 | | |
| 12 (aspherical surface) | 7.984 | 1.10 | 1.62004 | 36.26 |
| 13 (aspherical surface) | 12.841 | 0.63 | | |
| 14 (aperture stop) | ∞ | D14 | | |
| 15 (aspherical surface) | 8.390 | 4.20 | 1.49700 | 81.54 |
| 16 (aspherical surface) | −12.715 | 0.15 | | |
| 17 | 20.858 | 3.13 | 1.73310 | 48.90 |
| 18 | −11.096 | 0.64 | 2.00330 | 28.27 |
| 19 | 45.444 | 2.03 | | |
| 20 | 29.628 | 1.00 | 1.88300 | 40.76 |
| 21 | 5.905 | D21 | | |
| 22 | 9.485 | 2.60 | 1.49700 | 81.54 |
| 23 | −67.288 | D23 | | |
| 24 | ∞ | 0.50 | 1.54771 | 62.84 |
| 25 | ∞ | 0.50 | | |
| 26 | ∞ | 0.50 | 1.51633 | 64.14 |
| 27 | ∞ | 0.37 | | |
| 28 (imaging plane) | ∞ | | | |

| Aspherical surface data | | | | | | |
|---|---|---|---|---|---|---|
| Surface No. | R | K | $A_4$ | $A_6$ | $A_8$ | $A_{10}$ |
| 5 | 18.089 | 0.000 | −3.20227e−05 | −4.41726e−08 | 2.02047e−08 | −7.06606e−10 |
| 6 | −13.688 | 0.000 | 1.21565e−04 | −1.36822e−07 | 2.04976e−08 | −6.73719e−10 |
| 7 | −15.666 | 0.000 | 3.17622e−04 | −1.05265e−05 | 2.20291e−07 | −3.54143e−09 |
| 8 | 10.420 | 0.000 | −5.88966e−05 | −7.49146e−06 | −7.70010e−08 | |
| 12 | 7.984 | 0.000 | −2.63292e−04 | 1.31949e−05 | −1.72362e−06 | |
| 13 | 12.841 | 0.000 | 1.00751e−05 | 1.54948e−05 | −1.73639e−06 | |
| 15 | 8.390 | 0.000 | −2.25513e−04 | 1.09723e−06 | −7.01220e−08 | 1.21220e−09 |
| 16 | −12.715 | 0.000 | 2.31583e−04 | 1.27253e−06 | −4.58123e−08 | 1.24344e−09 |

| Various data | | | |
|---|---|---|---|
| Zoom ratio | 6.72 | | |
| | Wide-angle position | Middle position | Telephoto position |
| Focal length | 5.13 | 13.16 | 34.45 |
| F-number | 3.51 | 5.61 | 6.00 |
| Angle of view | 82.88 | 31.77 | 12.50 |
| Image height | 3.84 | 3.84 | 3.84 |
| Total length of the zoom lens | 66.65 | 66.65 | 66.65 |
| back focus | 4.93 | 4.11 | 4.12 |
| D6 | 0.60 | 4.99 | 8.76 |
| D11 | 8.66 | 4.28 | 0.50 |
| D14 | 17.43 | 9.72 | 1.05 |
| D21 | 1.00 | 9.53 | 18.19 |
| D23 | 3.41 | 2.59 | 2.60 |

-continued

Lens component data for the zoom lens

| Lens component number | Object-side surface of a lens component | Focal length |
|---|---|---|
| 1 | 1 | 14.80 |
| 2 | 7 | −7.89 |
| 3 | 12 | 31.33 |
| 4 | 15 | 17.72 |
| 5 | 22 | 16.92 |

Data regarding the above condition in the first embodiment

Condition (1) (or $1.6 < \beta_2(t)/\beta_2(w) < 10.0$): $\beta_2(t)/\beta_2(w) = 2.25$
Condition (2) (or $3.3 < \beta_4(t)/\beta_4(w) < 10.0$): $\beta_4(t)/\beta_4(w) = 3.55$
Condition (3) (or $0.3 < |\phi_4/\phi_2| < 0.7$): $|\phi_4/\phi_2| = 0.45$
Condition (4) (or $1 < D_p/ih_w < 5$): $D_p/ih_w = 2.60$
Condition (5) (or $1.95 < n_{d1} < 2.1$): $n_{d1} = 2.00$
Condition (6) (or $18 < \nu_{d1} < 30$): $\nu_{d1} = 25.46$
Condition (7) (or $3.5 < f_t/f_w < 7.0$): $f_t/f_w = 6.72$ Numerical data in the third embodiment in the case that distortion is electrically corrected are as follows, where data which are not shown below have the same value as the above data in the case that distortion is not electrically corrected, and a unit of length used in the data is millimeter (mm):

Various data in the case that distortion is electrically corrected

| | Zoom ratio | | 6.72 |
|---|---|---|---|
| | Wide-angle position | Middle position | Telephoto position |
| Angle of view | 78.58 | 31.77 | 12.50 |
| Image height | 3.62 | 3.84 | 3.84 |

Figure 7A:
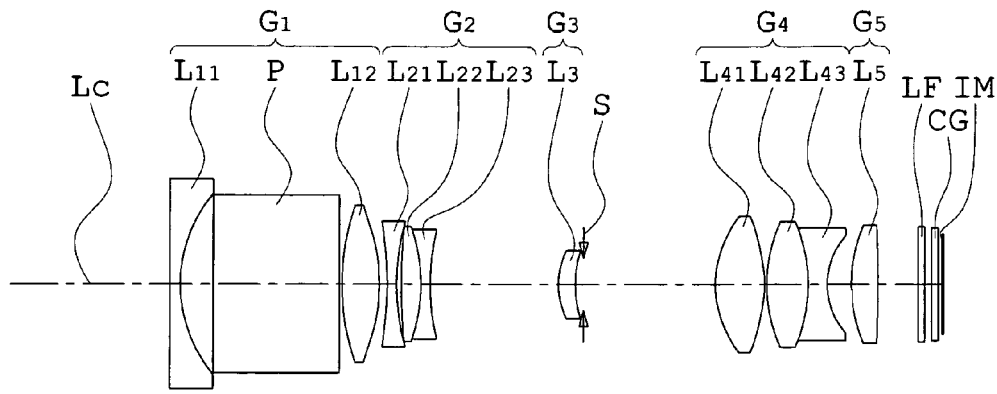
FIGS. 7A, 7B, and 7C are cross sectional views showing optical arrangements, developed along the optical axis, in wide-angle, middle, and telephoto positions, respectively, in infinite object point focusing of the zoom lens according to the fourth embodiment of the present invention.
Figure 7B:
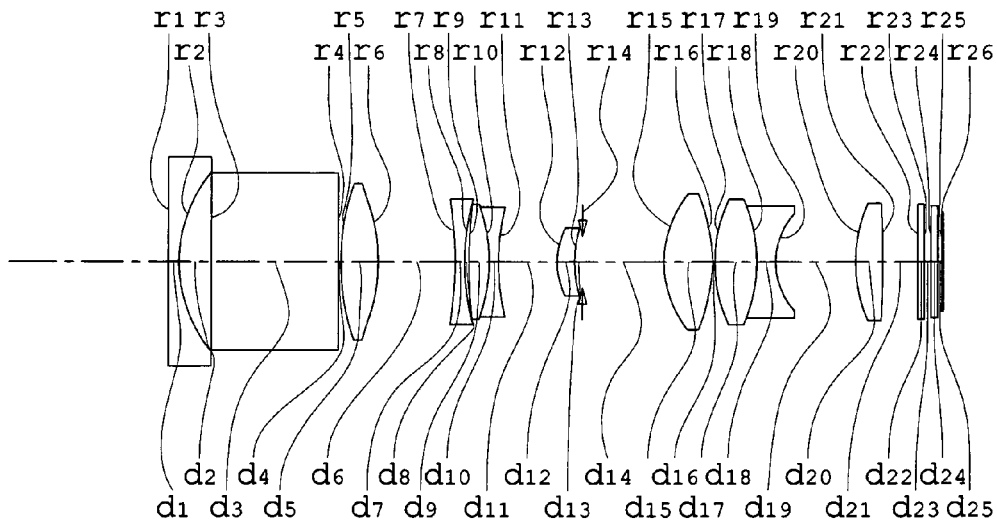
Figure 7C:
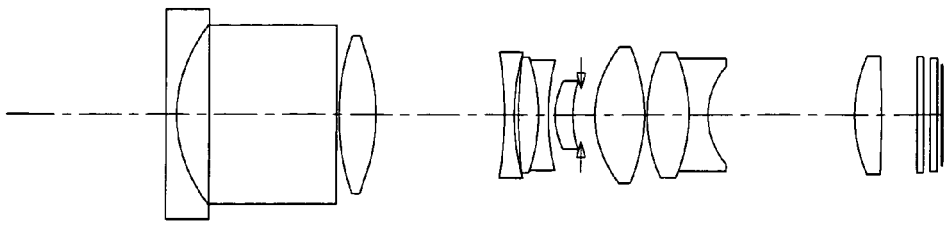

Data regarding the above condition in the first embodiment in the case that distortion is corrected Condition (1) (or $1.6 < \beta_2(t)/\beta_2(w) < 10.0$): $\beta_2(t)/\beta_2(w) = 2.25$
Condition (2) (or $3.3 < \beta_4(t)/\beta_4(w) < 10.0$): $\beta_4(t)/\beta_4(w) = 3.55$
Condition (3) (or $0.3 < |\phi_4/\phi_2| < 0.7$): $|\phi_4/\phi_2| = 0.45$
Condition (4) (or $1 < D_p/ih_w < 5$): $D_p/ih_w = 2.76$
Condition (5) (or $1.95 < n_{d1} < 2.1$): $n_{d1} = 2.00$
Condition (6) (or $18 < \nu_{d1} < 30$): $\nu_{d1} = 25.46$
Condition (7) (or $3.5 < f_t/f_w < 7.0$): $f_t/f_w = 6.72$ Fourth Embodiment FIGS. 7A, 7B, and 7C are cross sectional views showing optical arrangements, developed along the optical axis, in wide-angle, middle, and telephoto positions, respectively, in infinite object point focusing of the zoom lens according to the fourth embodiment of the present invention. FIGS. 8A-8D, 8E-8H, and 8I-8L are diagrams showing aberration characteristics in wide-angle, middle, and telephoto positions respectively, in infinite objective point focusing of the zoom lens shown in FIGS. 7A-7C.

First, the optical arrangement according to the fourth embodiment will be explained with FIGS. 7A, 7B, and 7C. A zoom lens according to the present embodiment comprises, in order from the object side, a first lens component $G_1$ with positive power, a second lens component $G_2$ with negative power, a third lens component $G_3$ with positive power, a fourth lens component $G_4$ with positive power, and a fifth lens component $G_5$ with positive power, and the lens components are arranged on the optical axis Lc. An aperture stop S, which is integrated with the lens component $G_3$, is arranged between the lens component $G_3$ and the lens component $G_4$. A low-pass filter LF, a CCD cover grass CG, and a CCD with an imaging plane IM are arranged in this order from the object side on the image side of the fifth lens component $G_5$.

The first lens component $G_1$ comprises: a first lens element $L_{11}$ which has negative power and is a plano-concave lens whose image-side surface is aspherical and whose concave surface faces to the image side; a prism P which is a reflecting member of changing an optical path; and a second lens element $L_{12}$ which has positive power and is a biconvex lens whose both surfaces are aspherical. The lens elements $L_{11}$, the prism P, and the lens element $L_{12}$ are arranged in this order from the object side.

The second lens component $G_2$ comprises: a first lens element $L_{21}$ which has negative power and is a biconcave lens whose object-side surface is aspherical; and a cemented lens consisting of a second lens element $L_{22}$ which is a biconvex lens and has positive power and a third lens element $L_{23}$ which is a biconcave lens and has negative power. The lens elements $L_{21}$, $L_{22}$, and $L_{23}$ are arranged in this order from the object side.

The third lens component $G_3$ comprises only a lens element $L_3$ with positive power. The lens element $L_3$ is a meniscus lens whose object-side surface is aspherical and whose convex surface faces to the object side.

The fourth lens component $G_4$ comprises: a fourth lens element $L_{41}$ which has positive power and is a biconvex lens whose both surfaces are aspherical; a cemented lens consisting of a second lens element $L_{42}$ which is a biconvex lens and has positive power and a third lens element $L_{43}$ which is a biconcave lens and has negative power.

The fifth lens component $G_5$ comprises only a lens element $L_5$ which is a biconvex lens and has positive power.

In changing a magnification from the wide-angle position to the telephoto position, the first lens component $G_1$ does not move on the optical axis Lc. The second lens component $G_2$ moves to the image side on the optical axis Lc with a distance between the first lens components $G_1$ and the second lens component $G_2$ being widen. The third lens component $G_3$ does not move on the optical axis Lc. The fourth lens component $G_4$ moves to the object side on the optical axis Lc with a distance between the third lens component $G_3$ and the fourth lens component $G_4$ being narrowed. The fifth lens component $G_5$ moves on the optical axis Lc in such a way that a distance between the fourth lens component $G_4$ and the fifth lens component $G_5$ is widen. The aperture stop S does not move on the optical axis Lc because the aperture stop S is integrated with the lens component $G_3$.

The lens arrangement and the numerical data of the fourth embodiment according to the present invention are as follows, where a unit of length used in the data is millimeter (mm), R denotes a radius of curvature, D denotes a spacing between surfaces, Nd denotes a refractive index, vd denotes the Abbe's number, K denotes a conic constant, and $A_4$, $A_6$, $A_8$, and $A_{10}$ denote aspherical coefficients:

Surface data

| Surface No. | R | D | Nd | vd |
|---|---|---|---|---|
| 1 | ∞ | 0.80 | 2.00069 | 25.46 |
| 2 | 11.397 | 2.42 | | |
| 3 | ∞ | 9.50 | 1.90366 | 31.32 |
| 4 | ∞ | 0.20 | | |
| 5 (aspherical surface) | 18.943 | 2.80 | 1.69680 | 55.53 |
| 6 (aspherical surface) | −13.861 | D6 | | |
| 7 (aspherical surface) | −21.431 | 0.69 | 1.83481 | 42.71 |
| 8 (aspherical surface) | 18.210 | 0.34 | | |
| 9 | 43.100 | 1.50 | 1.92286 | 20.88 |
| 10 | −13.479 | 0.70 | 1.88300 | 40.76 |
| 11 | 18.361 | D11 | | |
| 12 (aspherical surface) | 6.504 | 1.30 | 1.59551 | 39.24 |
| 13 | 9.104 | 0.63 | | |
| 14 (aperture stop) | ∞ | D14 | | |
| 15 (aspherical surface) | 7.779 | 3.72 | 1.49700 | 81.54 |
| 16 (aspherical surface) | −10.481 | 0.15 | | |
| 17 | 11.752 | 3.13 | 1.77377 | 47.17 |
| 18 | −12.412 | 1.42 | 2.00330 | 28.27 |
| 19 | 5.701 | D19 | | |
| 20 | 11.500 | 2.00 | 1.49700 | 81.54 |
| 21 | −115.635 | D21 | | |
| 22 | ∞ | 0.50 | 1.54771 | 62.84 |
| 23 | ∞ | 0.50 | | |
| 24 | ∞ | 0.50 | 1.51633 | 64.14 |
| 25 | ∞ | 0.37 | | |
| 26 (imaging plane) | ∞ | | | |

Aspherical surface data

| Surface No. | R | K | $A_4$ | $A_6$ | $A_8$ | $A_{10}$ |
|---|---|---|---|---|---|---|
| 2 | 11.397 | 0.000 | −1.49688e−05 | −1.66327e−07 | −1.53468e−09 | 1.83307e−10 |
| 5 | 18.943 | 0.000 | −4.43998e−05 | 6.79485e−07 | −8.12120e−09 | −1.64936e−10 |
| 6 | −13.861 | 0.000 | 6.45550e−05 | 9.91432e−07 | −1.73289e−08 | −3.66996e−11 |
| 7 | −21.431 | 0.000 | 1.32626e−04 | −1.01545e−06 | 1.97526e−08 | −6.86320e−10 |
| 12 | 6.504 | 0.000 | −3.42007e−04 | −4.57563e−06 | −3.60841e−07 | |
| 15 | 7.779 | 0.000 | −3.91152e−04 | −6.95999e−07 | 1.50407e−07 | −5.07404e−09 |
| 16 | −10.481 | 0.000 | 3.61646e−04 | −3.02044e−06 | 3.29434e−07 | −7.68518e−09 |

Various data

| Zoom ratio | | 4.66 | |
|---|---|---|---|
| | Wide-angle position | Middle position | Telephoto position |
| Focal length | 4.39 | 9.38 | 20.45 |
| F-number | 3.51 | 4.61 | 6.00 |
| Angle of view | 97.30 | 46.08 | 22.30 |
| Image height | 4.20 | 4.20 | 4.20 |
| Total length of the zoom lens | 57.61 | 57.61 | 57.61 |
| back focus | 4.49 | 4.12 | 4.12 |
| D6 | 0.60 | 5.83 | 9.67 |
| D11 | 9.57 | 4.34 | 0.50 |
| D14 | 9.86 | 6.04 | 1.05 |
| D19 | 1.80 | 5.99 | 10.98 |
| D21 | 2.97 | 2.60 | 2.60 |

Lens component data for the zoom lens

| Lens component number | Object-side surface of a lens component | Focal length |
|---|---|---|
| 1 | 1 | 16.78 |
| 2 | 7 | −8.81 |
| 3 | 12 | 32.23 |
| 4 | 15 | 14.24 |
| 5 | 20 | 21.16 |

-continued

Data regarding the above condition in the first embodiment

Condition (1) (or $1.6 < \beta_2(t)/\beta_2(w) < 10.0$): $\beta_2(t)/\beta_2(w) = 1.96$
Condition (2) (or $3.3 < \beta_4(t)/\beta_4(w) < 10.0$): $\beta_4(t)/\beta_4(w) = 3.46$
Condition (3) (or $0.3 < |\phi_4/\phi_2| < 0.7$): $|\phi_4/\phi_2| = 0.62$
Condition (4) (or $1 < D_p/ih_w < 5$): $D_p/ih_w = 2.47$
Condition (5) (or $1.95 < n_{d1} < 2.1$): $n_{d1} = 2.00$
Condition (6) (or $18 < v_{d1} < 30$): $v_{d1} = 25.46$
Condition (7) (or $3.5 < f_t/f_w < 7.0$): $f_t/f_w = 4.66$ Numerical data in the fourth embodiment in the case that distortion is electrically corrected are as follows, where data which are not shown below have the same value as the above data in the case that distortion is not electrically corrected, and a unit of length used in the data is millimeter (mm):

Various data in the case that distortion is electrically corrected

| Zoom ratio | | 4.66 | |
|---|---|---|---|
| | Wide-angle position | Middle position | Telephoto position |
| Angle of view | 93.10 | 46.08 | 22.30 |
| Image height | 3.94 | 4.20 | 4.20 |

Data regarding the above condition in the first embodiment in the case that distortion is corrected Condition (1) (or $1.6 < \beta_2(t)/\beta_2(w) < 10.0$): $\beta_2(t)/\beta_2(w) = 1.96$
Condition (2) (or $3.3 < \beta_4(t)/\beta_4(w) < 10.0$): $\beta_4(t)/\beta_4(w) = 3.46$
Condition (3) (or $0.3 < |\phi_4/\phi_2| < 0.7$): $|\phi_4/\phi_2| = 0.62$
Condition (4) (or $1 < D_p/ih_w < 5$): $D_p/ih_w = 2.41$
Condition (5) (or $1.95 < n_{d1} < 2.1$): $n_{d1} = 2.00$
Condition (6) (or $18 < v_{d1} < 30$): $v_{d1} = 25.46$
Condition (7) (or $3.5 < f_t/f_w < 7.0$): $f_t/f_w = 4.66$ Although the zoom lens in each of the above embodiments consists of the five lens components, the zoom lens according to the present invention is not limited to these arrangement and may be designed in such a way that another lens component is arranged on the image side of the fifth lens component. Although the reflecting member is a prism in the zoom lens in each of the above embodiments, the zoom lens according to the present invention is not limited to such a constitution and a mirror may be used as the reflecting member.

The zoom lens according to the present invention may be designed as follows: the zoom lens according to the present invention is preferable designed so that focusing for focus adjustment is carried out by a lens component located at the most image-side position. A low load is added to a motor in focusing because the lens weight is light in the lens component located at such a position. In addition, it becomes easy to downsize an image pickup apparatus, because the total length of the zoom lens does not change in focusing and it becomes easy to arrange a driving motor in a lens frame. Although focusing for focus adjustment is preferable carried out by a lens component located at the most image-side position in this way, focusing may be carried out by the other lens component. In addition, focusing may be carried out by a plurality of lens components. Or, focusing may be carried out by moving the whole zoom lens or by partially moving lens elements of a lens component.

A decline in brightness of the periphery of an image (shading) may be reduced by shifting a micro lens of a CCD in the zoom lens according to the present invention. For example, a design for a micro lens of a CCD may be changed in accordance with an angle of incidence of light in each image height, or an amount of a decline in brightness of the periphery of an image may be corrected by an image processing.

A zoom lens according to the present invention may be designed to place a flare stop in addition to an aperture stop in order to cut off unwanted light such as ghost and flare. Also, the flare stop may be located at any of positions on the object side of the first lens component, between the first and second lens components, between the second and third lens components, between the third and fourth lens components, between the fourth and fifth lens components, and between the fifth lens component and the imaging plane. The flare stop may be constructed with a frame member or with another member. In addition, the flare stop may be constructed in such a way that it is printed directly on an optical member or that paint or an adhesive seal is used. The flare stop may have any of shapes of a circle, an ellipse, a rectangle, a polygon, and a contour surrounded by a function curve. The flare stop may be designed to cut off not only detrimental light beams but also light beams such as coma flare on the periphery of an image.

In the zoom lens according to the present invention, antireflection coat may be applied to each lens element so that ghost and/or flare is reduced. In this case, in order to lessen ghost and/or flare more effectively, it is desirable that the antireflection coat to be applied is a multi-coat. An Infrared-cutoff coat may be applied not to a low-pass filter but to the lens surface of each lens element, a cover grass and so on. Also, in order to prevent ghost and/or flare from occurring, it is generally performed that the antireflection coat is applied to the air contact surface of a lens element. On the other hand, the refractive index of an adhesive on the cementing surface of a cemented lens is much higher than that of air. Hence, the cementing surface of a cemented lens often has the refractive index originally equal to or less than a single layer coat, and thus the coat is not particularly applied in most case. However, when the antireflection coat is positively applied to the cementing surface of a cemented lens, ghost and/or flare can be further lessened and a more favorable image can be obtained.

In particular, high-refractive index grass materials by which the effect of correction for aberration is obtained have been popularized in recent years and have come to be often used in optical systems for cameras. However, when the high-refractive index glass material is used for the cemented lens, reflection at the cementing surface ceases to be negligible. In this case, the application of the antireflection coat to the cementing surface is particularly effective. Such effective use of the coat of the cementing surface is disclosed in each of Japanese patent Kokai Nos. Hei 2-27301, 2001-324676, 2005-92115 and U.S. Pat. No. 7,116,482. For the application of the coat, it is only necessary that a relatively high-refractive index coating substance, such as $Ta_2O_5$, $TiO_2$, $Nb_2O_5$, $ZrO_2$, $HfO_2$, $CeO_2$, $SnO_2$, $In_2O_3$, $ZnO$, or $Y_2O_3$, or a relatively low-refractive index coating substance, such as $MgF_2$, $SiO_2$, or $Al_2O$ is properly selected in accordance with the refractive index of a lens for a substrate and the refractive index of the adhesive and is set to a film thickness such as to satisfy a phase condition.

As a matter of course, the coat of the cementing surface, like the coating on the air contact surface of a lens element, may be used as a multi-coat. In this case, a proper combination of a coat substance and a film thickness of each layer makes it possible to reduce more reflectance and to control the spectral characteristic and/or the angular characteristic of the reflectance.

An image pickup apparatus with the above zoom lens is preferably available for a digital camera, a personal computer and a mobile phone. The embodiments of the image pickup apparatus will be shown below.

Figure 9:
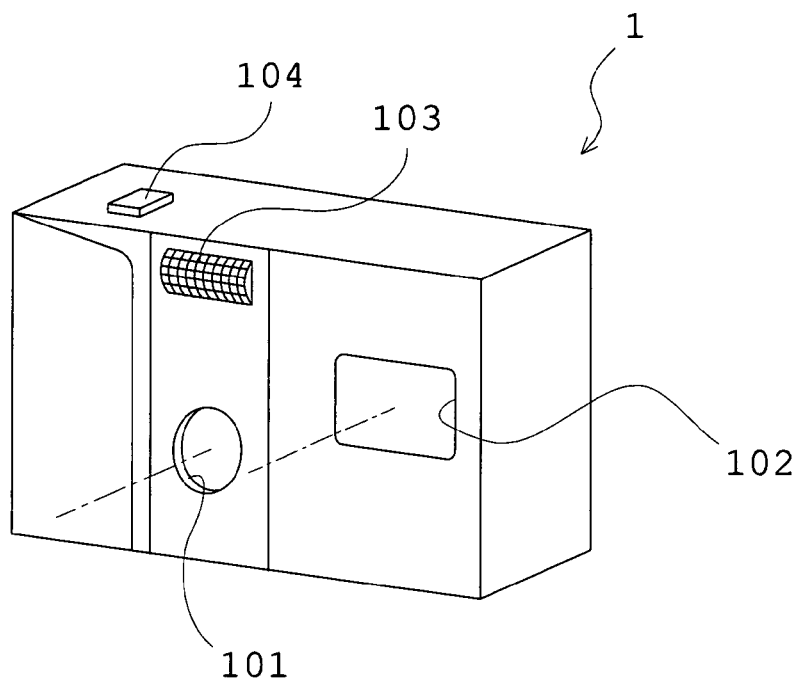
FIG. 9 is a perspective front view showing the appearance of an example of a digital camera into which an image pickup apparatus is incorporated.
Figure 10:
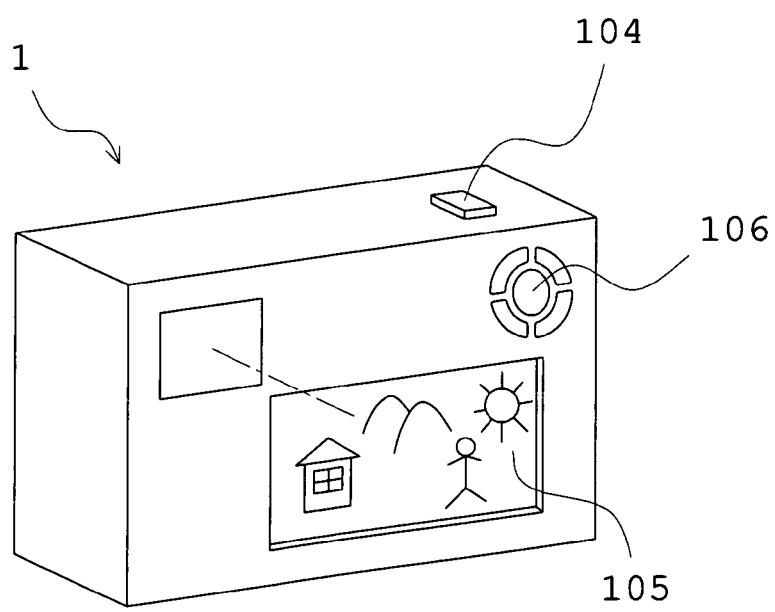
FIG. 10 is a perspective rear view showing the digital camera shown in FIG. 9.
Figure 11:
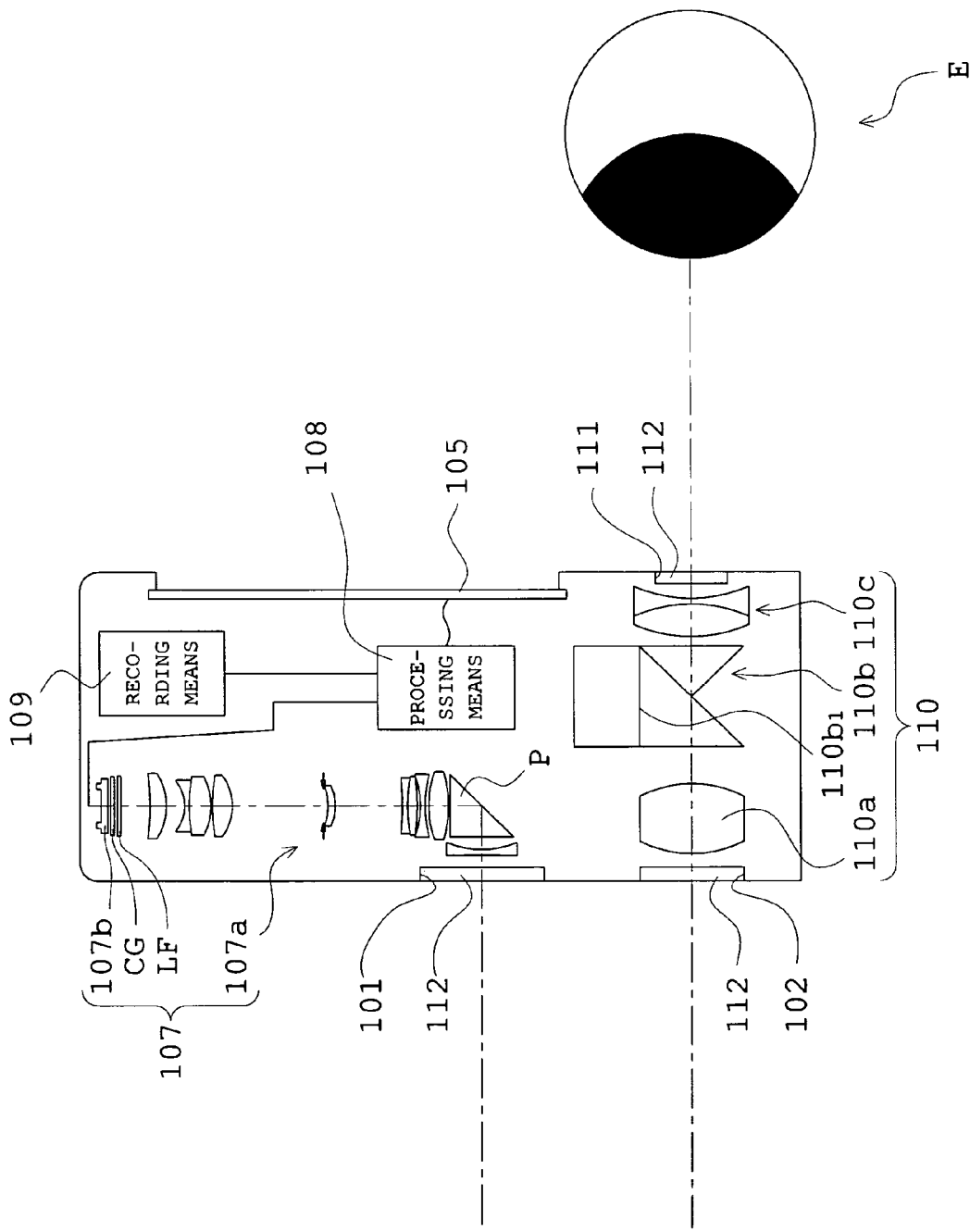
FIG. 11 is a cross sectional view showing the structure of the digital camera shown in FIG. 9.
Figure 12:
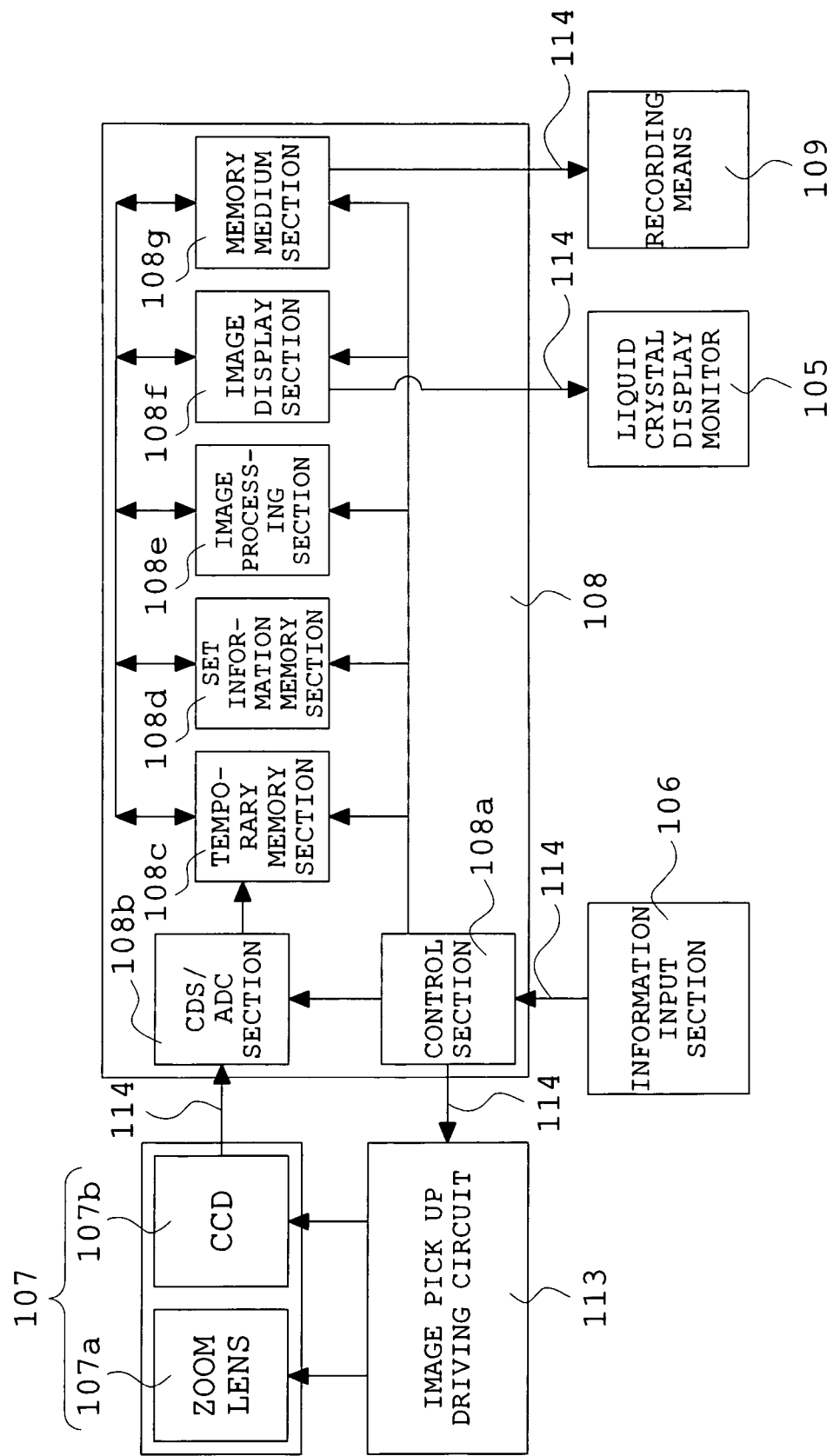
FIG. 12 is a block diagram showing the structure of the essential part of an internal circuit of the digital camera shown in FIG. 9.

First, one example of a digital camera having a zoom lens according to the present inventions is shown. FIG. 9 is a perspective front view showing the appearance of an example of a digital camera into which the image pickup apparatus is incorporated. FIG. 10 is a perspective rear view showing the digital camera shown in FIG. 9. FIG. 11 is a schematic view showing the internal structure of the digital camera shown in FIGS. 9 and 10. FIG. 12 is a block diagram showing the structure of the essential part of an internal circuit of the digital camera 1.

First, the constitution of the digital camera 1 will be explained with FIGS. 9 to 11. The front of the digital camera 1 is provided with a photographing opening section 101, a finder opening section 102 and a flash lamp button 103. The upside of the digital camera 1 is provided with a shutter button 104. The rear of the digital camera 1 is provided with a liquid crystal display monitor 105 and an information input section 106. An image pickup apparatus 107, a processing means 108, a recording means 109 and a finder optical system 110 are provided inside the digital camera 1. A cover member 112 is placed in the photographing opening section 101, the finder opening section 102, and an aperture 111 which is located on the exit side of the finder optical system 110 and is placed on the rear of the digital camera 1.

The image pickup apparatus 107 incorporated into the digital camera 1 corresponds to the image pickup apparatus according to the present invention which is described above. The image pickup apparatus 107 comprises, in order from the object side, a zoom lens 107a having a prism P, a low-pass filter LF, a CCD cover glass CG, and a CCD 107b. The prism P of the zoom lens 107a changes the direction of an optical path of light entering from the photographing opening section 101 from direction perpendicular to the front surface of the digital camera 1 to direction parallel to the front surface of the digital camera 1 in the inside of the digital camera 1.

The finder optical system 110 comprises a finder objective optical system 110a, a Porro prism 110b, and an eyepiece optical system 110c. Light entering from an object into the finder opening section 102 is led to the Porro prism P that is an image erecting member by the finder objective optical system 110a, an objective image is formed in a field frame $11b_1$ as an erect image, and then, the objective image is led to an observer's eye E by the eyepiece optical system 110c.

When the shutter button 104 on the upside of the digital camera 1 is pushed, the digital camera 1 is designed in such a way that image information is obtained through the image pickup apparatus 107 in response to the operation of pushing the shutter button 104. The image information obtained by the image pickup apparatus 107 is recorded in the recording means 109 through the processing means 108. In addition, it is also possible to take the recorded image information by the processing means 108 to make the liquid crystal display monitor 105 on the rear of the digital camera 1 display the information as an electronic image.

Such a constitution of the digital camera 1 can realize the compact design of the digital camera 1, in particular, downsizing of the digital camera 1 in the direction of the depth of the digital camera 1, as compared with a type of digital camera in which an optical path of light is not changed, because an optical path for obtaining image information is changed in the inside of the digital camera 1. In addition, not only can the above constitution of the digital camera 1 realize high performance of the digital camera 1, but also the above constitution can lower costs, because the image pickup apparatus 107 has the zoom lens 107a: which has a wide angle of view and a high variable magnification ratio, is favorably corrected for aberration, is bright, and has a long back focus; and in which filters can be arranged.

Also, although in this example the optical path used to acquire the image information is changed in the lateral direction of the digital camera 1, it may be changed in the longitudinal direction of the digital camera 1. In the example, plane-parallel plates are used as the cover members 102, but the most object-side lens of the zoom lens 107a of the image pickup apparatus 107, the most object-side lens of the finder objective optical system 110a, and the most object-side lens of the eyepiece optical system may be fitted directly into the opening sections, without using the cover members 112 for the opening sections.

Next, in accordance with FIG. 12, reference is made to image information processing which is performed in the digital camera 1. The digital camera 1, as shown in FIG. 12, is provided with an image pickup dividing circuit 113 in addition to the image pickup apparatus 107, the processing means 108, and the recording section 109. The processing means 108 has a control section 108a, a CDS/ADC section 108b, a temporary memory section 108c, a set information memory section 108d, an image processing section 108e, an image display section 108f, and memory medium section 108g, and these sections are mutually connected so that the input and output of data are possible. Also, the processing means 108 is connected to the liquid crystal display monitor 105, the information input section 106, the image pickup apparatus 107, the recording section 109, and the image pickup driving circuit 113 through buses 114 connected to a signal input-output port of the processing means. The image pickup driving circuit 113 is such as to drive and control the zoom lens 107a and the CCD 107b of the image pickup apparatus 107 in accordance with a signal from the control section 108a of the processing means 108.

The control section 108a of the control means 108 includes a central arithmetic processing unit such as CPU and houses a program memory, not shown. The control section 108a is a circuit which controls the whole of digital camera 1 in accordance with a program stored in the program memory and instructions which are inputted by a user of the digital camera 1 through the information input section 106 having a input button and switch. The CDS/ADC section 108b of the control means 108 is a circuit which amplifies an electrical signal inputted from the CCD 107b of the image pickup apparatus 107, performs analog-to-digital conversion, and outputs raw image data in which only the amplification and the analog-to-digital conversion are performed (or Bayer data, which are called RAW data) to the temporary memory section 108c. The temporary memory section 108c of the control means 108 is, for example, a buffer including a SDRAM and is a memory unit of temporarily memorizing the above RAW data which is outputted from the CDS/ADC section 108b.

The set information memory section 108d of the processing means 108 has a ROM section and a RAM section which are not shown in the figure. The information memory 108d is a circuit that reads various image quality parameters which are stored in the ROM section in advance and that memorizes a image quality parameter which is selected from the read image quality parameters by the input operation of the information input section 106 of a user of the digital camera 1 in the RAM section.

The image processing section 108e of the processing means 108 is a circuit that reads the RAW data memorized in the temporary memory section 108c or a memory medium section 108g to electrically perform various image processing processes, which include correction for distortion, in accordance with a image quality parameter designated by a user of the digital camera 1.

The image display section 108f is a circuit that is connected to the liquid crystal display monitor 105 to display an image, an operation menu, and so forth on the liquid crystal display monitor 105. The memory medium section 108g is a circuit that controls a unit which records and/or saves RAW data transferred from the temporary memory section 108c and image data image-processed by the image processing section 108e. In this embodiment, the unit which records and/or saves the data is the recording means 109 incorporated into the digital camera 1. However, the unit which records and/or saves the data may be, for example, a recording medium, such as a flash memory, which can be removably fitted to the outside of the digital camera 1.

Figure 13:
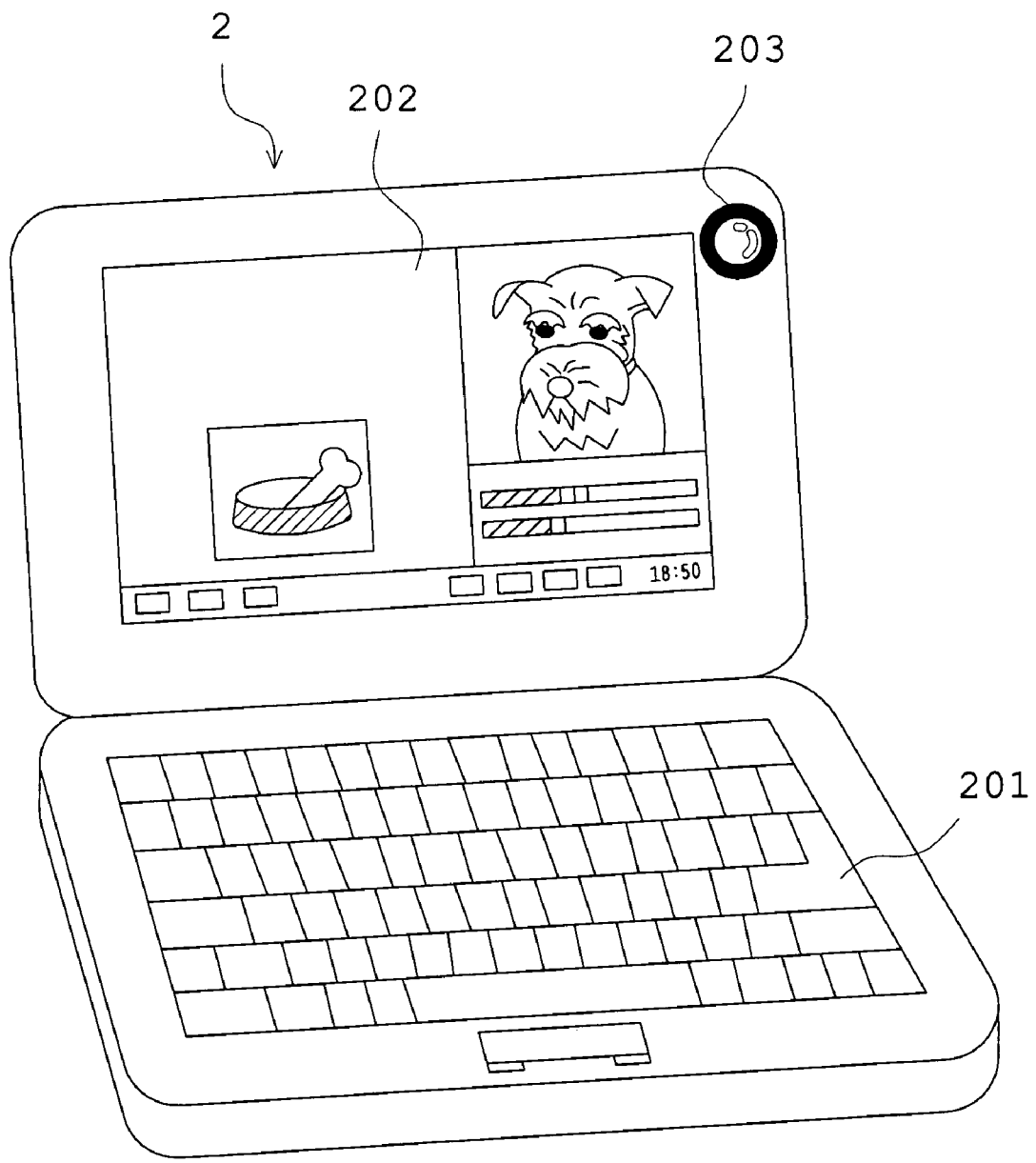
FIG. 13 is a perspective front view showing a personal computer whose cover is opened and into which an image pickup apparatus is incorporated.
Figure 14:
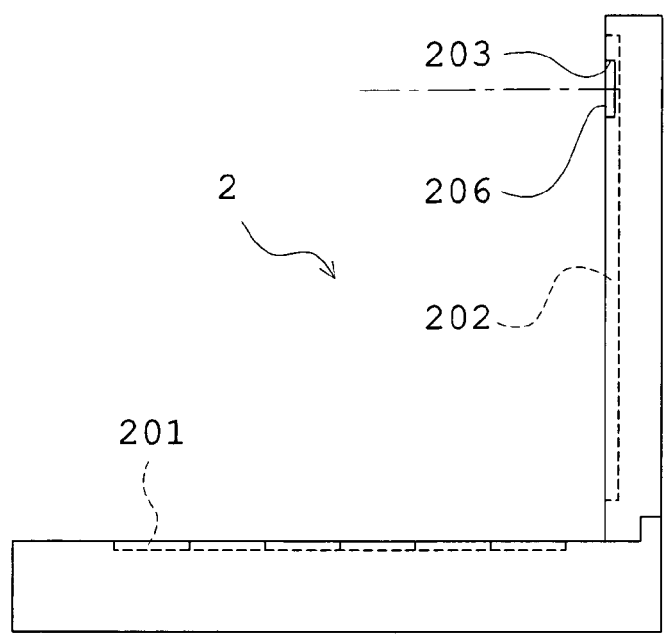
FIG. 14 is a side view showing the personal computer shown in FIG. 13.
Figure 15:
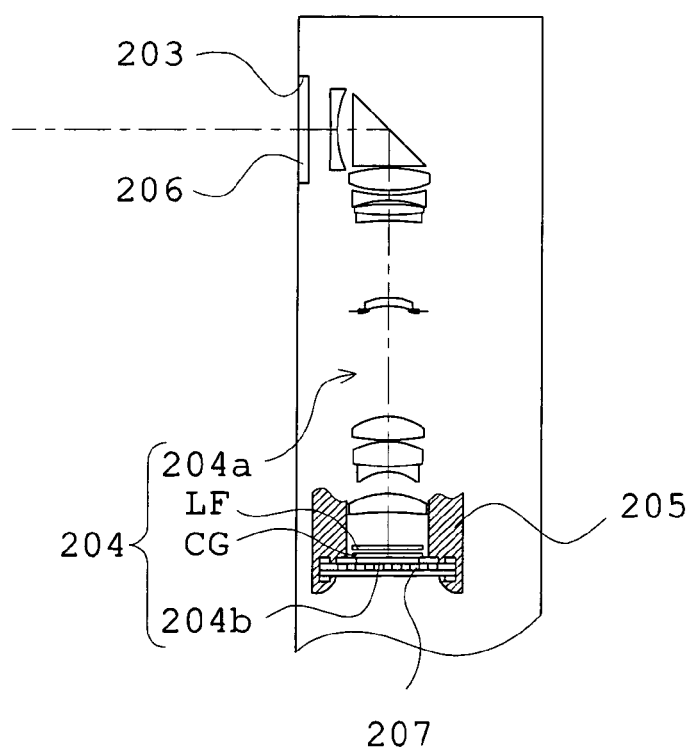
FIG. 15 is a cross sectional view showing an image pickup apparatus incorporated into the personal computer shown in FIG. 13 and the periphery of the image pickup apparatus.

Next, one example of a personal computer that is an information processing apparatus into which the image pickup apparatus according to the present invention is incorporated will be shown. FIG. 13 is a perspective front view showing a personal computer whose cover is opened and into which the image pickup apparatus according to the present invention is incorporated. FIG. 14 is a side view showing the personal computer shown in FIG. 13. FIG. 15 is a cross sectional view showing the image pickup apparatus incorporated into the personal computer and the periphery of the image pickup apparatus. As shown in FIGS. 13 to 15, the personal computer 2 has a keyboard 201 for a user to input information from the outside of the personal computer 2, and a liquid crystal display monitor 202 for displaying information to the user. An opening 203 for photographing is provided at the side of the liquid crystal display monitor 202. An image pickup apparatus 204 for photographing the user himself and a surrounding image, and an information processing means and a recording means which are not shown in the figures are provided inside the personal computer 2.

The image pickup apparatus 204 incorporated into the personal computer 2 corresponds to the image pickup apparatus according to the present invention explained in each embodiment mentioned above. The image pickup apparatus 204 comprises, in order from the object side, a zoom lens 204a having a prism P, a low-pass filter LF, a CCD cover glass CG, and a CCD 204b which is an imaging element chip. The optical path of light entering from the user himself and the periphery of the user into the opening 203 is changed from a direction perpendicular to the liquid crystal display monitor 202 of the personal computer 2 to a direction parallel to the liquid crystal display monitor 202 by the prism P of the zoom lens 204a inside the personal computer 2.

Because the image pickup apparatus 204, which changes an optical path of light for obtaining image information inside the personal computer 2, is used in the personal computer 2, the personal computer 2 having such a constitution can easily realize the compact design as compared with a personal computer having an image pickup apparatus which does not change an optical path. Also, the personal computer 2 can easily realize high performance and low cost, because the image pickup apparatus 204 for obtaining an image has the zoom lens 204a which has a wide angle of view and a high variable magnification ratio, is favorably corrected for aberration, is bright, and has a long back focus in which filters can be arranged.

The cover glass CG is additionally cemented to the CCD 204b which is an imaging element chip, and the cover glass CG and the CCD 204b are integrally constructed as an imaging unit and can be placed in a lens frame 205 holding the zoom lens 204a by fitting the cover glass CG and the CCD 204b into the rear end of the lens flame 205 in a single operation. For this reason, alignment of the zoom lens 104a and the CCD 204b and the adjustment of the face-to-face spacing are not required, and the assembly is simplified. A cover member 206 for protecting the zoom lens 204a is placed at the front end of the lens frame 205 (which is not shown in the figure). A driving mechanism for the zoom lens 204a provided in the lens frame 205 is omitted from the figure. An object image received by the CCD 204b is inputted into a processing means of the personal computer 2 through a terminal 207, and is displayed as an electronic image on the liquid crystal display monitor 202. Also, the image can be displayed on a personal computer of a remote communication partner from the processing means through the Internet or a telephone circuit.

Although the image pickup apparatus 204 is placed at the side of the liquid crystal display monitor 202 in this embodiment, the placement of the image pickup apparatus 204 is not limited to the above placement, and the image pickup apparatus 204 may be placed anywhere, for example, at a position except for the side of the liquid crystal display monitor 202 or in the periphery of the keyboard 201. Although a transmission liquid crystal display element, which is illuminated from the rear side by a backlight, is used for the liquid crystal display monitor 202 in this embodiment, a reflection liquid crystal display element reflecting and displaying light from the front may be used. The liquid crystal display monitor 202 may be replaced with a display device such as a CRT display.

Next, one example of a mobile phone that is an information processing apparatus into which an image pickup apparatus according to the present invention is incorporated will be shown. FIG. 16A is a front view showing the mobile phone into which the image pickup apparatus is incorporated. FIG. 16B are a side view showing the mobile phone. FIG. 16C is a cross sectional view showing an image pickup apparatus incorporated into the mobile phone and the periphery of the image pickup apparatus. As shown in FIGS. 16A to 16C, the mobile phone 3 has a microphone section 301 for inputting a user's voice as information, a speaker section 302 for outputting a voice of a communication partner, input keys 303 by which the user inputs information, a liquid crystal display monitor 304 for displaying information of photographed images of the user himself and the communication partner and telephone number, and antenna 305 for transmitting and receiving communication waves. An opening 306 for photographing is provided at the side of the speaker section 302. An image pickup apparatus 307 for photographing the user himself and a surrounding image, and an information processing means and a recording means which are not shown in the figures are provided inside the mobile phone 3. A liquid crystal display element is used in the liquid crystal display monitor 304 The placement of each constitution is not limited to such a constitution in the figures, and the placement may be suitably changed.

The image pickup apparatus 307 incorporated into the mobile phone 3 corresponds to the image pickup apparatus according to the present invention which is explained above. The image pickup apparatus 307 comprises, in order from the object side, a zoom lens 307a having a prism P, a low-pass filter LF, a CCD cover glass CG, and a CCD 307b which is an imaging element chip, and is placed on an optical path of light entering from an user himself and the periphery of the user into the opening 306. For this reason, the optical path of light entering from the user himself and the periphery of the user into the opening 306 is changed from a direction perpendicular to the liquid crystal display monitor 304 of the mobile phone 3 to a direction parallel the liquid crystal display monitor 304 by the prism P of the zoom lens 307a inside the mobile phone 3.

Because the image pickup apparatus 307, which changes an optical path of light for obtaining image information inside the mobile phone 3, is used in the mobile phone 3, the mobile phone 3 having such a constitution can easily realize the compact design as compared with a mobile phone having an image pickup apparatus which does not change an optical path. Also, the mobile phone 3 can easily realize high performance and/or low cost, because the image pickup apparatus 307 for obtaining an image has the zoom lens 307a which has a wide angle of view and a high variable magnification ratio, is favorably corrected for aberration, is bright, and has a long back focus in which filters can be arranged.

The cover glass CG is additionally cemented to the CCD 307b which is an imaging element chip, and the cover glass CG and the CCD 307b are integrally constructed as an imaging unit and can be placed in a lens frame 308 holding the zoom lens 307a by fitting the cover glass CG and the CCD 307b into the rear end of the lens flame 308 in a single operation. For this reason, alignment of the zoom lens 307a and the CCD 307b and the adjustment of the face-to-face spacing are not required, and the assembly is simplified. A cover member 309 for protecting the zoom lens 307a is placed at the front end of the lens frame 308 (which is not shown in the figure). A driving mechanism for the zoom lens 307a provided in the lens frame 308 is omitted from the figures. An object image received by the CCD 307b is inputted into a processing means of the mobile phone 3 through a terminal 310, and is displayed as an electronic image on the liquid crystal display monitor 304. Also, when an image is sent to a communication partner, the processing means has a signal processing function of converting the image information into a transmittable signal.

What is claimed is:

1. A zoom lens comprising, in order from an object side, a first lens component with positive refracting power, a second lens component with negative refracting power, a third lens component with positive refracting power, a fourth lens component with positive refracting power, and a fifth lens component with positive refracting power, wherein a magnification is changed by properly changing distances between the lens components, and the first lens component comprises a reflecting member reflecting an optical path to satisfy the following conditions:

$$1.6 < \beta_2(t)/\beta_2(w) < 10.0$$

$$3.3 < \beta_4(t)/\beta_4(w) < 10.0$$

where $\beta_2(t)$ is a lateral magnification of the second lens component in a telephoto position in infinite focusing, $\beta_2(w)$ is a lateral magnification of the second lens component in a wide-angle position in infinite focusing, $\beta_4(t)$ is a lateral magnification of the fourth lens component in a telephoto position in infinite focusing, and $\beta_4(w)$ is a lateral magnification of the fourth lens component in a wide-angle position in infinite focusing.

2. The zoom lens according to claim 1, further satisfying the following condition:

$$0.3 < |\phi_4/\phi_2| < 0.7$$

where $\phi_2$ is a refracting power of the second lens component, and $\phi_4$ is a refracting power of the fourth lens component.

3. The zoom lens according to claim 1, wherein the first lens component comprises, in order from the object side, a first lens element with negative refracting power, a reflecting member bending an optical path, and a second lens element with positive refracting power.

4. The zoom lens according to claim 1, wherein the reflecting member is a prism, and satisfies the following condition:

$$1 < D_p/ih_w < 5$$

where $D_p$ is a length of the prism on an optical axis, and $ih_w$ is an image height at the wide-angle position.

5. The zoom lens according to claim 1, further satisfying following conditions:

$$1.95 < n_{d1} < 2.1$$

$$18 < v_{d1} < 30$$

where $n_{d1}$ is a refractive index of a negative lens located at a most object-side position in the first lens component, and $v_{d1}$ is an Abbe's number of the negative lens.

6. The zoom lens according to claim 1, further satisfying the following condition:

$$3.5 < f_t/f_w < 7.0$$

where $f_w$ is a focal length of an entire zoom lens system at the wide-angle position, and $f_t$ is a focal length of the entire zoom lens system at the telephoto position.

7. The zoom lens according to claim 1, wherein the third lens component comprises a single lens with positive refracting power.

8. An image pickup apparatus comprising a zoom lens according to claim 1 and a circuit electrically correcting distortion or chromatic aberration of magnification.

* * * * *